United States Patent
Elliott

(10) Patent No.: US 6,811,703 B2
(45) Date of Patent: Nov. 2, 2004

(54) METHODS FOR ADSORPTION AND RETENTION OF SOLVATED COMPOUNDS AND IONS

(76) Inventor: Curtis Elliott, 606 Lakeview Dr., Royal Palm Beach, FL (US) 33411

( * ) Notice: Subject to any disclaimer, the term of this patent is extended or adjusted under 35 U.S.C. 154(b) by 60 days.

(21) Appl. No.: 10/174,102

(22) Filed: Jun. 18, 2002

(65) Prior Publication Data

US 2004/0195182 A1 Oct. 7, 2004

(51) Int. Cl.$^7$ .................................................. C02F 1/28
(52) U.S. Cl. ........................ 210/681; 210/690; 525/480
(58) Field of Search ................................ 210/681, 690; 525/480; 528/495

(56) References Cited

U.S. PATENT DOCUMENTS

| | | |
|---|---|---|
| 3,041,238 A | 6/1962 | Allegrini |
| 3,080,214 A | 3/1963 | Duke et al. |
| 3,857,815 A * | 12/1974 | Smith et al. ................. 525/507 |
| 4,054,515 A | 10/1977 | Sawyer, Jr. |
| 4,116,825 A | 9/1978 | Sawyer, Jr. |
| 4,116,826 A | 9/1978 | Sawyer, Jr. |
| 4,116,827 A | 9/1978 | Sawyer, Jr. |
| 4,116,828 A | 9/1978 | Sawyer, Jr. |
| 4,147,624 A | 4/1979 | Modell |
| 4,167,481 A | 9/1979 | Cremers et al. |
| 4,444,665 A | 4/1984 | Hildebrandt |
| 4,511,657 A | 4/1985 | Colaruotolo et al. |
| 4,971,698 A | 11/1990 | Weber et al. |
| 4,995,969 A | 2/1991 | LaVigne |
| 5,028,338 A | 7/1991 | Hooykaas |
| 5,202,033 A | 4/1993 | Stanforth et al. |
| 5,254,364 A | 10/1993 | Kviesitis |
| 5,583,165 A | 12/1996 | Kviesitis |
| 5,667,694 A | 9/1997 | Cody et al. |
| 5,685,981 A | 11/1997 | Koslow |
| 5,882,521 A | 3/1999 | Bouvier et al. |
| 5,922,449 A | 7/1999 | Revis |
| 5,976,367 A | 11/1999 | Bouvier et al. |
| 6,048,377 A | 4/2000 | Kviesitis |
| 6,106,721 A | 8/2000 | Bouvier et al. |
| 6,160,194 A | 12/2000 | Pignatello |
| 6,254,780 B1 | 7/2001 | Bouvier et al. |

* cited by examiner

*Primary Examiner*—Robert A. Hopkins
(74) *Attorney, Agent, or Firm*—Stoll, Keenon & Park LLP; Joanne S. Richards

(57) ABSTRACT

A solid phase mixed solvent polymer, compositions and methods for removing and retaining solvated organic compounds and inorganic ions from water, wastewater, superficial and ground water, soil and other environmental sources, a soil amendment and method resulting from adhesively coating the polymer onto sand along with at least one ion exchange material, and methods for the containment, reduction, and prevention of organic leaching from soils, agricultural, industrial, and commercial environments, and in particular, sports and athletic turf facilities such as golf courses where pesticides are frequently applied.

32 Claims, 8 Drawing Sheets

METHODS FOR ADSORPTION AND RETENTION OF SOLVATED COMPOUNDS AND IONS

1.0 FIELD OF THE INVENTION

Figure 1A:
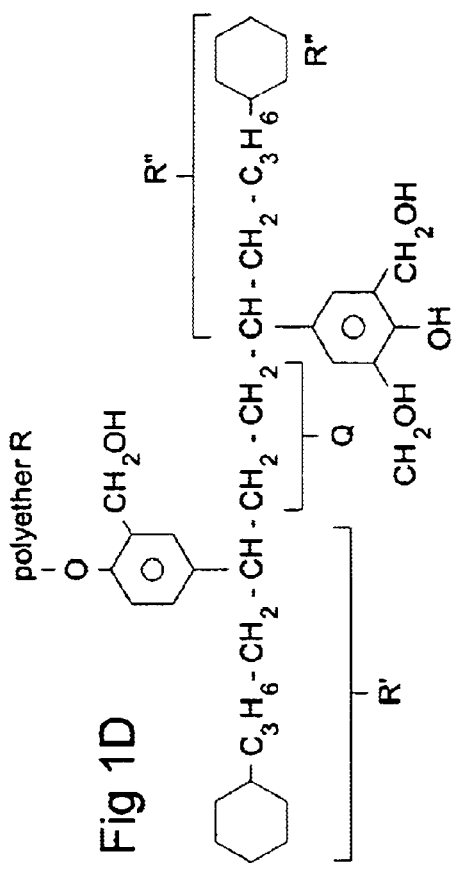

The present invention relates generally to the removal of organic compounds and inorganic ions from soils, hazardous spills, and aqueous environments and to the use of this polymer as an adhesive to affix an ion exchanger to remove inorganic compounds. More particularly, this invention pertains to a technology for reducing runoff and/or leaching of organic compounds such as pesticides present in an agricultural, environmental or industrial setting.

In preferred embodiments, compositions and methods are disclosed for stabilized organic polymer formulations capable of binding organic compounds, such as insecticides, herbicides, fungicides and nematicides. Also provided are methods of using such compounds in the remediation of environmental contamination, in the reduction of pesticide leaching from soil, in the containment of such pollutants, as an amendment to soil and method of coating sand particles with other particles to impart ion exchange characteristics, water holding, and plant growth enhancement capacities without reduction of soil percolation rate.

2.0 BACKGROUND OF THE INVENTION

Water pollution remains a major concern although numerous substances and methods exist for its prevention or reduction. Contamination of the groundwater also can occur thus containment of the pollutants at their source is a goal. Conventional water treatment involves collection of wastewater in a central plant to be processed. This treatment mandates constant maintenance and monitoring by knowledgeable persons in the field. In U.S. Pat. No. 4,971,698 to Weber et al., biodegradable contaminants in wastewater are removed by a decentralized process dependent on microorganisms or products thereof. This method may be economically feasible for containing compounds at the source, but because of its dependence on the viability of the microorganisms it may require reapplication and its usefulness may be limited to specific biodegradable compounds.

A. Landfill Leachate Treatment

Microbes in landfills tend to produce a large amount of organic acids due in large part to anaerobic metabolism. Organic acids can complex with metal ions thereby mobilizing the metals and protecting them from oxidation which may result in precipitation from solution. This association of organic acids and inorganic materials is referred to as landfill leachate. Other pollutants that comprise landfill leachate include pathogenic organisms, solvents, pesticides, hazardous wastes, and industrial and wastewater.

Studies relating to the extent to which leachate leaves a landfill location by groundwater or surface water have shown that in arid and semiarid climate sites the water transport rates are slow, however, for sites in temperate climate the leaching happens fast, presenting a serious environmental concern. This landfill leachate contamination of aquifer and groundwater continues despite landfill construction and design criteria to minimize it.

Lining landfills with impermeable membranes has also been considered wherein leachate is collected and treated either on or off-site. Off-site treatment may involve piping the leachate to a nearby sewer system, and combining it with the municipal sanitary sewage. This off-site treatment methodology, not only requires a municipal treatment facility capable of processing the leachate loadings but also a small concentration of leachate to wastewater for effective processing. For large landfill operations, on-site treatment of leachate with package plants has been attempted; but with limited success.

In U.S. Pat. No. 4,995,969 to LaVigne describes an on-site leachate treatment method in which the leachate is forced to run through leachate-tolerant plants and microorganisms that are capable of metabolizing organic carbon compounds and adsorbing heavy metals within the leachate. Although economical and effective, it may require substantial time and experimentation to establish the ecosystem in any given landfill. As materials in the landfill change, time to adjust the ecosystem may be necessary and such time may allow an inordinate amount of leachate to escape into the environment. Also, some landfills may not be able to support the growth of the necessary organisms.

Oxidation ponds or lagoons for treating leachate tend to be unsightly, malodorous, relatively slow, require large land areas and are a breeding ground for mosquitoes.

B. Adsorbents

One method of removing organic compounds from the environment has been through adsorbents which are generally solid phase materials having very high surface area-to-weight ratios and which have the ability to concentrate adsorbates on their surfaces (U.S. Pat. No. 4,147,624). Inorganic adsorbents include activated carbon, silica, silicates, alumina natural, and synthetic zeolites and clays.

Solid phase extraction (SPE) has been used in analytical chemistry to extract, purify, and concentrate analytes such as pollutants from large volume samples such as environmental water. Also, SPE's are used as a chromatographic matrix for the separation of mixtures whose components have different polarities.

The most common SPE material is octadecyl silica (C18 silica) although, for some applications, C8, C6, C4, C2 silica are also available. C18 silica is composed of pure silicon dioxide grains with surface silanol groups that are reacted with trichlorosilyloctadecyl groups. The result is 18 carbon chains bound to the silica. The resultant material is known as reverse phase (i.e., non-polar) silica.

When water containing relatively non-polar contaminants are passed through this material, the hydrophobic components associate with the C18 surface and the bulk of the water passes through to waste. In analytical work the contaminants are then eluted from the SPE via a solvent less polar than water.

In reverse phase chromatography, a solvent gradient from more to less polar is often used to selectively elute the different components.

The efficiency of the removal of contaminants from water by C18 silica is a function of the relative affinity of the component for the C18 hydrocarbon versus water. Thus somewhat polar compounds are not very effectively removed by C18 silica.

Importantly, the system that maximizes retention on the C18 matrix would include an extremely hydrophobic analyte dispersed in an extremely polar solvent (e.g., pure water). Solutes of intermediate polarity will be sorbed to a lesser extent by C18 silica.

The adsorption of non-polar compounds within an aqueous matrix by the C18 coated surface of the silica is preceded by the wetting of the SPE by the aqueous sample. Due to the hydrophobic nature of the C18 coating the SPE surface is quite water repellent. This inherent hydrophobiciy must be overcome before the C18 surface can efficiently adsorb the compounds of interest.

Many methods have been developed to circumvent this problem of surface wetting. Among these are the prewetting of the C18 coated silica with a solvent, such as methanol, which is miscible in both the C18 surface and water. The aqueous sample is then applied to the prewetted SPE.

Older SPE's used minimal C18 loading on the silica surface. This allowed the residual (highly polar) silanol groups on the silica surface to Interact with the aqueous lad sample. Other examples include using a C3 spacer onto silica (via silanol) to which a proprietary polar group is attached, then a C8 chain is added; an unspecified reverse phase coating on silica; a C6 hexyvphenyl on silica, only reverse phase.

In an attempt to circumvent the inherent hydrophobicity associated with a highly non-polar stationary phase, the synthesis of mixed mode solid phase sorbents has become the current technology. Typically, the mixed mode SPE polymers contains both hydrophilic and hydrophobic moieties. In this mixed mode arrangement, the small hydrophilic moiety merely allows the polymer surface (i.e. divinylbenzene, styrene, etc.) to be water-wetted. The non-polar moiety is still the only component responsible for the actual adsorption of the pollutant. Thus the "hydrophobicity" of the non-polar moiety is critical.

Solutes of Intermediate polarity would be maximally sorbed to the present invention via the polyoxyether/R. The polyether which can be MPEG (methyl PEG), EPEG (ethyl PEG), propyl PEG, butyl PEG, ethyl PEG/PPG for example C sub 1 to C sub 21 for example, or other number of hydrocarbons acts as a more polar stationary phase than the C18 referred to in the prior explanation on SPE's. The polarity is further modified via the hydrophobic R' and R" (alkyl groups). Thus, the polarity of the present invention can be fine-tuned to exhibit any desired polarity.

In summary, the extent of sorption by any stationary phase is a function of the polarity of the stationary phase, the polarity of the solute, and the polarity of the solvent.

Also known in the art is that organic material can be bound to the surface of a porous support material. In U.S. Pat. No. 5,922,449 to Revis a bonded phase material useful with a chromatographic separation process includes a silanol bearing porous material, a stoiciometric amount of interactive silanes which provide the porous material with a gradient of functionality of varied polarity and not obtainable by separate interactive silanes. In Revis, the reaction of the organic moieties with the silanol groups on the surface of the silica is random as is the proximity of different organic groups to one another. Also, the silicon ether bond which connects the organic moiety to the surface of the silica has lower bond energy (less stable) than a carbon ether bond. The reagents used to generate the silica based invention (organo-chlorosilanes) are corrosive and toxic, expensive, and the resulting silica could not be used as an adhesive for other chemically active particles.

Carbon or bone char impregnated with activated carbon have been widely used to remove contaminants from aqueous systems. Not all grades perform well in all uses and the more effective grades tend to be rather expensive. Likewise, mineral-based adsorbents have not performed well in aqueous systems.

Mineral substrates such as sepiolite, attapulgite and smectites may be modified to obtain a more organophilic surface to be effective adsorbents for certain uses, however, a relatively high surface area and a cationic exchange capacity above is required (U.S. Pat. No. 4,444,665). Unfortunately, in their naturally occurring state, many of these clay minerals (aluminosilicates) swell or slake in aqueous systems resulting in gel formation or colloidal dispersions that are extremely difficult to separate from the liquid. Likewise, granular forms of these clays in naturally occurring state are useless since they simply fall apart in aqueous media.

Surface modification of minerals has been demonstrated, but the majority of these compositions require swelling or gelling-grade clays, e.g., montmorillonite, bentonite, hectorite, attapulgite, sepiolite and other smectites, in order to be useful for adsorption of organic compounds (Cowan et al., 1969). Difficulties in handling these materials, however, preclude their use in large-scale treatment of organic compounds.

U.S. Pat. No. 4,167,481 to Cremers et al. discloses effective removal of metal cations from wastewater but the process requires addition of polyamines and the presence of a cation exchanger such as natural bentonites, montmorillonites and zeolites.

Unmodified, heat-treated attapulgite has been used in water treatment to remove certain metal cations, hormones, toxins, viral micro-organisms and pesticides. Reference is made to the following U.S. Patents to Sawyer: U.S. Pat. Nos. 4,054,515, 4,116,825; 4,116,826; 4,116,827; 4,116,828. A specially processed form of heat-treated attapulgite is disclosed as a filter aid in U.S. Pat. Re. No. 25,464 (Oct. 15, 1963) of U.S. Pat. No. 3,080,214. A method of preparing heat-treated, socalled "activated" attapulgite which is substantially non-gelling and non-slaking is disclosed in U.S. Pat. No. 3,041,238 to Allegrini. These compounds, however, are unsuitable for the removal of compounds from agricultural and industrial applications which are exposed to aqueous solutions and in applications where such clays and formulations are either prohibitively expensive, or produce undesirable by products such as slaking or gelling end products. For example, such compounds are not useful in soil strata such as golf course greens where a high degree of percolativity is required and where the addition of such products would compromise the percolation and drainage of these soils.

C. Deficiencies in the Prior Art

A number of compositions and methods have been developed to remove or reduce the concentration of organic compounds from the environment. Each has one or more shortcomings that renders it unsuitable for use in certain agricultural and industrial processes, e.g. an inability to maintain particle size and integrity when contacted with aqueous environments, instability, result in foaming, are too soluble, too viscous for easy and timely application, too sensitive to high pH conditions, have diminished range of adsorbable compounds due to structural restrictions, are not easily wettable, are either prohibitively expensive, or unsuitable for application in areas where such particle size maintenance and percolation factors are critical. Water holding enhancement and cation exchange capacities are also beneficial but are lacking in present methods and compositions. Improvements in timed-release, or controlled-release agricultural products which are biofriendly are also needed. It would also be helpful if agronomic factors such as plant growth enhancement occurred which would be particularly beneficial in the preferred embodiment of use on golf courses.

3.0 BRIEF SUMMARY OF THE INVENTION

The present invention overcomes these and other shortcomings in the prior art by providing compositions and methods for the highly stable salvation and adsorption of organic compounds, for imparting ion exchange and water holding capacities to the soil profile without reduction of percolation rate, for the removal of organic contaminants (such as pesticides) from agricultural and commercial environs, and nutrient retention capacity for enhancement of plant growth, e.g. grass. Also provided are devices and apparatus for the remediation of organic wastes in situ and in solution using reactive barriers, flow through filtration systems, and organic waste containment facilities. In certain embodiments, compositions are provided for the reduction of pesticide leaching from athletic facilities, and in particular, golf course greens, and athletic turfs.

The invention discloses and claims a solid phase mixed solvent (SPMS) polymer, a polyoxyethylene diether, comprising monoalkyl PEG or PEG/PPG ether of the methylolated dialkyl diphenol. Preferably, the methylolated monoalkyl PEG/PPG dialkyl diphenol is crosslinked via the methylol groups within a phenol-formaldehyde (PF) resole. A monolalkyl ether of PEG/PPG is reacted with phosphorous tribromide to form monoalkyl PEG/PPG bromide which is reacted with the methylolated dialkyldiphenol via the Williamson ether synthesis thus forming the monoalkyl PEG/PPG ether of the methylolated dialkyl diphenol (the SPMS polymer). See FIGS. 1A and 1B. The Williamson ether synthesis was used because it was found that no reaction occurred when PEG, an alcohol was added to a phenolic resole and the resultant mixture was cured at 180° C., i.e. no cross-linking occurred. Methylol, a hydroxyl bound to a carbon located alpha to a phonolic ring is required for cross-linking. Potentially, another type of crosslink could occur via a dual Williamson starting with a dihydroxy PEG. With the present invention it is the ether group that provides the polar character.

The SPMS polymer may be utilized directly, or coated or bound to a matrix or a substrate. Preferably, the polymer is capable of binding an organic compound, and in particular, organic contaminants, fertilizers, and pesticides including insecticides, a herbicides, a fungicides, or a nematicides. The polymer may be utilized within an agricultural site as a reactive containment barrier or a hazardous spill cleanup device or apparatus. (FIG. 12A) The polymer may also be formulated into a filter, sedimentation tank, or water treatment device. (FIG. 12B) The polymer may be Incorporated into a soil amendment, additive, hazardous spill barrier or containment means. The polymer may also be formulated for use in a device or system for treating water, soil, sewage, wastewater, or agricultural leachate, or for removing organic pollutants from a solution.

Alternatively, the SPMS polymer compositions may be comprised with a system for removing pesticides from a leachate or contaminated solution. The system generally comprises at least one leachate or contaminated water supply source, with at least one inlet port into which the SPMS polymer composition is placed and into which the leachate supply source flows to contact the leachate with the SPMS polymer composition, and at least one outlet port, and flow control means for draining the treated leachate from the treatment basin. (FIG. 13) The system may also comprise a continuous flow system or a batch processing system.

The invention also discloses and claims a method of preparing a SPMS polymer composition that has the desired property of being able to adsorb one or more organic compounds onto the polymer. The method generally involves coating, spraying, aerosolizing, or otherwise contacting a suitable matrix with the SPMS polymer composition under conditions effective to permit coating of the matrix with the composition.

A method of preparing a golf course to prevent leaching of a pesticide from the course and which enhances water holding capacity and plant growth is also provided by the invention which generally involves amending one or more layers of soil underneath the golf course grass with one or more SPMS polymer compositions. The composition may be applied to discrete layers under the athletic turf, alternatively may be mixed throughout the soil underneath the grass, or applied as a top dressing. See FIGS. 15A and 15B.

In a first embodiment, the present invention concerns solid phase mixed solvent polymers (SPMS polymers) that are capable of binding to organic compounds and preventing the leaching of such organic compositions from the area in which the SPMS polymers are located. The SPMS polymer of the present invention may be prepared so that they bind either polar or non-polar organic compounds, or alternatively, may be designed such that a single SPMS polymer, or a combination of two or more distinct SPMS polymers may bind both polar and non polar compounds. The ability of SPMS polymers to bind more than one type of organic compound makes them useful for a variety of organic chemical remediabon situations. A given SPMS molecule can be designed to adsorb a range of organic compounds based upon their range of polarity and charge density. This range extends from the intermediate polarity compounds which are soluble in the polyether to the non-polar alkyl groups at the other end of this range. Non-polar compounds soluble in hydrocarbons comprise this end of the range. In Bouvier U.S. Pat. No. 6,254,780, hydrophobicity is critical in that only the hydrophobic divinylbenzene (DVB) actually adsorbs the solute while the hydrophilic pyrolidone merely facilitates water wetting of the DVB surface. In contrast, the polyoxyether (polar moiety) of the present invention actually participates in the adsorption of the solute pollutant synergistically with the alkyl groups. The '780 patent teaches the use of a small hydrophilic moiety bound to the hydrophobic polymer matrix. The hydrophobic polymer is the site of adsorption of the pollutant The hydrophilic moiety merely facilitates the water-wetting of the polymer surface. The polyoxyether and the alkyl groups are configured on the final polymer in a format which is stereochemically favorable to their mutual interaction with the pollutant. The optimum sorption of a compound by the polymer is determined by the ratio of polyoxyether to alkyl groups as well as the distribution of charge on the pollutant molecule.

A mixture of SPMS's would extend the range of sorbable compounds although less capacity for a specific compound as compared to a "pure" SPMS polymer which has been optimized for that specific compound would be expected.

In a preferred embodiment, the SPMS polymer is a dialkyldiphenol-polyethylene glycol polymer. The ranges of polarity associated with the PEG and alkyl moieties translates into a wide range of solutes adsorbed. The steriochemical proximity of the polyoxyether moiety and the alkyl moiety is easily controlled and facilitates their synergistic solvation of the compounds of interest. Other advantages of the polymer of the present invention include the ease of synthesis, non-phytotoxic characteristic, excellent stability, and it is relatively inexpensive to make. MPEG (methoxy PEG) and other alkyl-PEG ethers and PEG derivatives including but not limited to PEG/PPG ethers and esters and PEG esters and ethers of various molecular weights, (6000, 7000, about 8000, about 9000 or greater) can be employed in the formulation of the PSMS of interest. MPEGs such as those with average molecular weights, eg. about 5000, however, are preferred for adsorption of many pesticides. In certain embodiments, the inventor contemplates the beneficial use of smaller molecular weight MPEGs, eg. from about 500 to about 4000 for the remediation and adsorption of certain organic compounds and may be useful in certain embodiments. Likewise, when preparing SPMS polymer compositions for the adsorption of multiple types of organic compounds, it may be desirable to prepare the SPMS using more than one PEG, e.g. different-sized MPEGs as starting materials, two or three different sized PEGs being preferable if more than one PEG is to be utilized.

Although formaldehyde is used as an illustration herein, it is contemplated that other low-molecular weight aldehydes including acetaldehyde, propionaldehyde, or butaraldehyde, may be substituted in creating derivative SPMS polymer formulations that may be desirable for certain applications of the polymer composition.

Preferably the phenol is at least a technical grade phenol, although any grade phenol may be used so long as the phenol does not contain trace impurities that would alter or inhibit the proper polymerization of the compound. Alternatively, the phenol component used in the preparation of the phenol- aldehyde (or formaldehyde) (PF) compound may include but is not limited to one or more of the following phenol derivatives: 1-hydroxyphenol, 2-hydroxyphenol, 3-hydroxyphenol, 1,2-dihydroxyphenol 1,3-dihydroxyphenol, 1,4-dihydroxyphenol, lignin and the like. In an illustrative embodiment, the phenol:formaldehyde component of the SPMS polymer was a PF resole (Cascophen SP—7550K, PF Resin, Bordon Chemical, Louisville, Ky.).

The adsorbent properties of the dialkyl diphenol polyoxyether (a telechelic molecule) crosslinked to a phenol-formaldehyde (PF) matrix (resole) permit their direct use in binding organic compounds, without the need of coating the compound onto a substrate. A telechelic molecule is a pre-polymer capable of entering into further polymerization through reacting terminal functional groups. The SPMS polymer compound is readily formulated for coatng, crosslinking, absorbing, or binding to a solid substrate or a matrix. This matrix or substrate may provide support or impart other physical properties to the SPMS polymer compound that facilitate its use in a variety of practical applications.

In another embodiment, the substrate upon which the SPMS polymer is coated is a sand, sea sand, or a mineral such as silicate. Formulations of the PF-PEG SPMS polymer coated onto sand particles are particularly preferred for use in the preparation of athletic turfs, such as golf courses, and the like, where maintaining the percolativity of the soil is important. These sand-SPMS polymer formulations are also desirable for amendment to agricultural soils, and to other environmental sites where location of the SPMS polymer for the purpose of adsorbing organic compounds is desirable.

In further embodiments, it may be desirable to apply the adsorbent to a substrate or matrix having a larger particle or mesh size than a granular substrate such as sand. In these instances, the SPMS polymer compositions may be formulated for application to rock, gravel, pebbles, clay, expanded clay, silica gels, zeolites, or metals (including metal filings, shaving, pellets, beads, turnings, etc.). Alternatively, the matrices may be a synthetic compounds such as plastics (e.g., polystyrenes, polyethylenes, polypropylenes, polybutalenes, nylon, rayon, dacron, ordon, etc.) or other monomeric or polymeric resins and the like. The SPMS polymer composition may also be applied to substrates such as beads, glass, glass fibers, fabrics, ceramics, fiber filters, spun fibers, and even onto a substrate of plant-derived or extractable material, e.g. cellulose fibers, lignins, etc. Virtually any solid or semi-solid support, matrix, or substrate or mixtures of these substrates is envisioned to be useful in the creation of SPMS polymer-formulations where it is desirable to impart the adsorptive capabilities of the polymer to a target surface. Because the SPMS polymer compositions, in the broadest sense, are used to adsorb organic compounds, they may also be used to form part of an apparatus or a device that is intended to remove or reduce the concentration of organic compounds from an environment or a contaminated site, solution, or water source. For example, in one preferred embodiment, a SPMS polymer composition may be added to the soil in or around a sports facility, agricultural, commercial industrial or residential turf or field, In a preferred embodiment, the SPMS polymer composition may be added to the soil or coated onto or integrated with sand for application to a subsurface layer of a golf course green.

In another embodiment, the SPMS polymer composition may comprise part of a water filter, a water treatment facility, a sediment filter, or a reactive barrier. As such, the compositions may be used to adsorb organic contaminants from a groundwater source, or a municipal water supply, or may be placed in the ground as a barrier to prevent leaching or seepage of contaminated water into a given area, or to prevent or reduce the amount of contaminant moving through the ground from one site to another.

Because of the widespread use of organic compounds (and particularly organic pesticides), the entrance and contamination of environmental soils, sites, and particularly water sources, is nearly inevitable. Many types of organic compounds may be introduced into the environmental, e.g. pesticides such as herbicides, rodenticides, insecticides, fungicides, microbicides, and nematicides. The application of pesticides to a target area may be contained through the use of the SPMS polymer compositions disclosed herein. For example, in one embodiment a SPMS polymer-sand adsorbent amendment was used to reduce or contain the migration of the nematicide, fenamiphos, and its metabolites, through the soil layers under a golf course green.

Organic compound spills, including pesticides, are a common occurrence. In such instances, the application or introduction of one or more SPMS polymer compositions to the affected area may be used to adsorb or contain such an organic spill. For non agricultural uses, the SPMS polymer composition may be applied directly to the contaminated site. After adsorption the resulting SPMS polymer-pollutant may be thermally oxidized, the result would be sand and $CO_2$. Thermal oxidation is currently used to decontaminate soil. After application to the spill, the SPMS polymer composition containing the adsorbed contaminant(s) may conveniently be collected or alternatively, the contaminant may be desorbed from the polymer and disposed of.

Alternatively, a SPMS polymer composition may be used to form a barrier at a perimeter around the spill. Of course, the barrier does not need to encircle the spill, but rather may be placed at a location in the general direction of migration of the spill so that it may be contained by the adsorbent or may be placed as a barrier at a location as preventive measure.

A common use of pesticides is in the maintenance of sports facilities. Sports facilities include, but are not limited to, golf, tennis, croquet, polo, horseracing, football, baseball, soccer, or cricket. A SPMS polymer composition may be added to the soil of the facility or may be a component of a drainage treatment system that collects wastewater, runoff, or leachate from the sports facility. Alternatively, the composition may be mixed or layered underneath the sod preferably as an amendment to the soil, such as a golf course green, In such a manner as to prevent pesticide leaching.

As a component of a golf course, it is important that the SPMS polymer composition maintain a high rate of percolativity or conductivity, be placed in a location to efficiently bind the pesticides applied to the course, and prematurely adsorb or inactivate the pesticide before its role is accomplished in the soil. One use of the SPMS polymer composition is as an amendment to one or more of the subterranean support structure layers of the golf course, particularly a green. These support structure layers include the gravel drainage blanket, intermediate layers, and the root zone layer. A sublayer of SPMS polymer-treated soil (for example, see FIG. 7B) can be added as a discrete layer beneath the sod layer In one or more of the subsurface, or subterranean, layers.

When mixed throughout the soil, an SPMS polymer composition may be effective at a range of ratios. The ratio of SPMS polymer composition to non-SPMS polymer compositions is about 1:0 to about 1:40, by weight, the preferred ratio being about 1:20 by weight. After mixing the clay with the sand/resole the clay coated sand is thermoset. The finished product is then added to sand, preferably plain quartz sand, in the ratio of about 25% SPMS to about 75% quartz sand and blended throughout the soil during construct of a golf green, or other facility, or may be added to the soil at a later date by, for example, tilling, injection (pressure), topdressing, backfilling holes introduced into the soil surface by, for example, aerification, and as off-site premix which is used for golf course construction. The SPMS polymer may be added to form one or more discrete layers within the soil. It is believed that, since the binding of pesticide to the polymer is not 100% or irreversible, it may be advantageous to place the SPMS polymer within the rootzone.

The aqueous microenvironment associated with the surface of the polymer particle contains some concentration of pesticide. This concentration is controlled by the partition co-efficient of the pesticide in water/polymer. This can be manipulated via the polymer formulation. The concentration of pesticide in the microenvironment is great enough to maintain efficacy of the pesticide with the excess pesticide residing on the polymer replenishing that removed by leaching and microbial degradation. Thus extending the efficacy of the pesticide by prolonging its existence within the soil. In preferred embodiments, the percentage of SPMS polymer composition comprising a discrete layer is such that it binds nearly all of the applied organic compound and maintains the hydraulic conductivity of the soil.

It is contemplated that the accumulation of the organic compound within the SPMS polymer-comprising layer or composition may serve to enhance microbial degradation of the organic compound. As such, the formulation of the invention may be used to enhance microbial colonization of an area where SPMS polymer is present. If the organic compound is a preferred substrate for a particular microbial organism. The extended presence of the compound in the soil due to the SPMS polymer sorbtion will favor the colonization of the soil by these microorganisms The adsorbed compound, however, may be less available to the microbes as compared to the same compound in solution.

Because the SPMS polymer compounds may be affixed to substrates of different particle sizes and compositions, SPMS polymer composition may improve the overall nature or character of the soil, as well as provide organic leachate adsorption. A SPMS polymer composition may be added to the soil to adsorb organic compounds in the soil or to alter the percolativity, consistency or integrity of the soil. It is common practice to add compounds to soils to improve the ability of these soils to support plant growth. The SPMS polymer compositions may not only provide organic adsorption, but may in fact improve the overall quality and retain nutrients in the soil to which it is added thus enhancing growth.

The use of the SPMS polymer as an adhesive for the binding of clay to the surface of a substrate circumvents the adverse effects of clay in soils (e.g., reduced percolativity) while preserving the beneficial ion exchange behavior of the clay. Ion exchange is a mechanism by which fertilizer cations and anions are retained within the exchanger then released slowly to the roots thus preventing a flush of nutrients into the groundwater subsequent to fertilization.

Also, clays swell when exposed to water, which occlude soil pores and reduce percolation. The clay bound to the sand surface by the polymer does not clog soil pores. The water associated with the swollen clay remains plant available. The polymer coated sand allows for greater water holding capacity than occurs in uncoated sand and thus plants show far less drought stress as compared with plants grown under similar conditions in uncoated sand.

Figure 6:
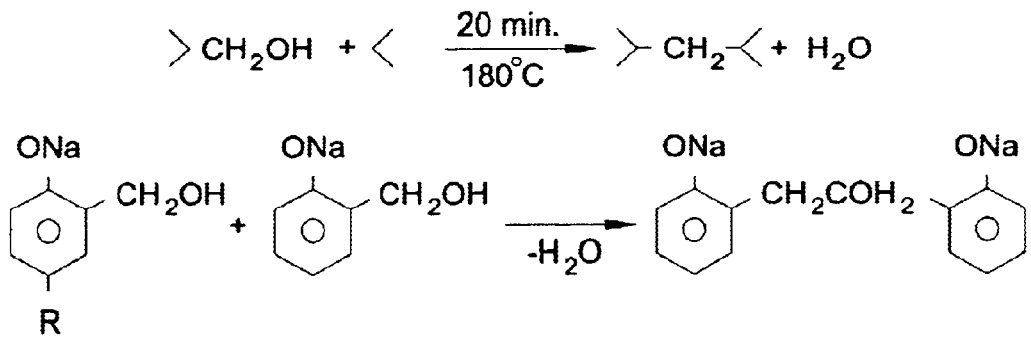

As an alternative to or in addition to soil amendments, an SPMS polymer composition may comprise a filter that is operatively connected to the drainage system of a golf green (FIG. 6). A simple filter system is taught in U.S. Pat. No. 5,685,981. Filters generally have an intake port, a chamber, and an outlet port. In preferred embodiments, the chamber comprises an SPMS polymer composition such that organic compounds within aqueous solutions are bound by the SPMS polymer composition and prevented from flowing through the outlet port thereby purifying the aqueous solution. The composition may be supported by a matrix such as sand, beads, fiber, etc., comprised within a filter cartridge, or, alternatively, coated on the chamber walls itself.

The present invention is also useable in the removal of organic compounds from aqueous solutions, eg. water, wastewater, sewage, leachate, groundwater, or industrial runoff. In preferred embodiments, the aqueous solution is leachate. One method of removing organic compounds from an aqueous solution is by use of a water treatment system. A water treatment system may be a simple column filter or a complex municipal water treatment facility.

The water systems commonly used by municipal water treatment facilities include sequence batch biological reactor, continuous activated sludge, trickling filter, aerated lagoon, and anaerobic filter. The aqueous solution may be treated by flowing through a column comprising an SPMS polymer composition or by contacting the aqueous solution with particles comprising SPMS polymer composition in a batch method. In the batch method, particles comprising an SPMS polymer composition are added to a water sample suspected of containing one or more organic compounds, mixed to provide sufficient contact between the particles and the organic compounds to allow binding, and then separated from the newly purified aqueous solution. Separation may be by means of gravity, centrifugation, magnetism, or filtration through a size-selective porous membrane, or a mesh filter, or other size-exclusionary grating, grid, etc.

4.0 BRIEF DESCRIPTION OF THE DRAWINGS

The invention may be better understood by reference to one or more of the following drawings in combination with the detailed description of specific embodiments presented herein.

FIG. 1A. General structural formula for the present invention showing the well-defined distance between phenol groups to interact with the pollutant, for example.

Figure 1D:
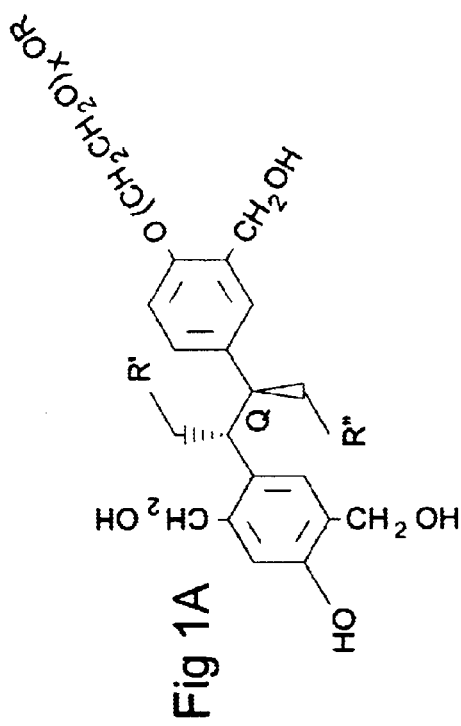
Figure 1C:
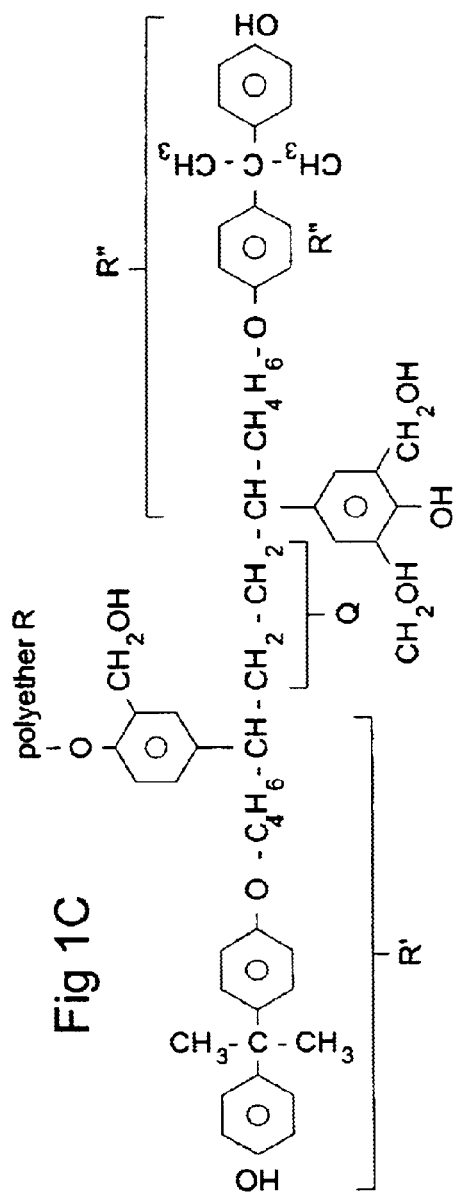
Figure 1B:
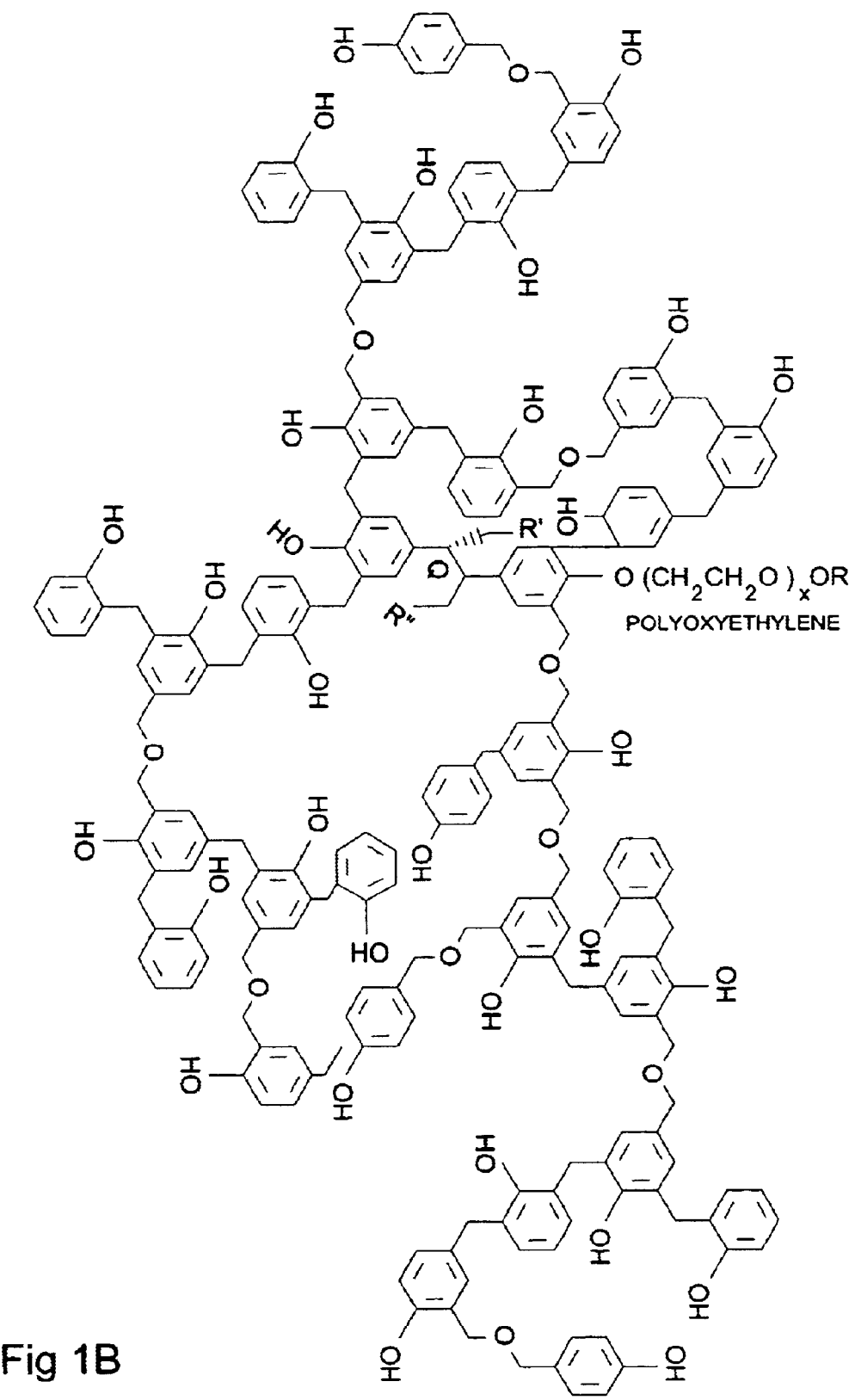

FIG. 1B. Structural representation of the present invention, a polyoxyether-dialkyldlphenol as cross-linked with phenol formaldehyde resole.

FIG. 1C. An example of the structural formula for the present Invention when the R' and R" groups are aromatic, e.g. blsphenol A pentyl ether.

FIG. 1D. An example of the structural formula for the present invention with the R' and R" groups are cyclic, e.g. pentyl cyclohexane.

Figure 2A:
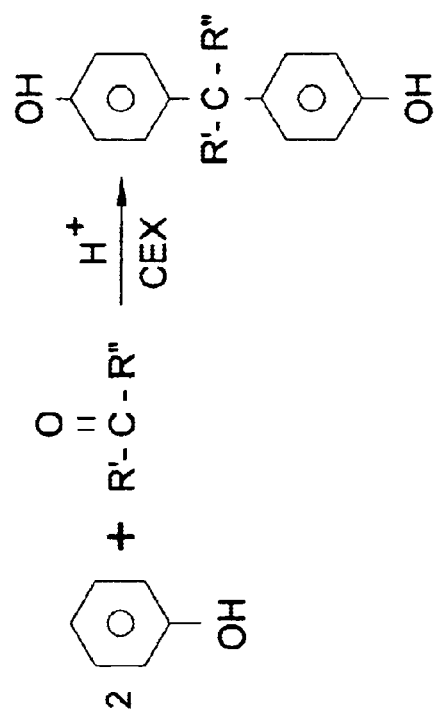

FIG. 2A. Condensation reaction of the ketone with phenol.

Figure 2B:
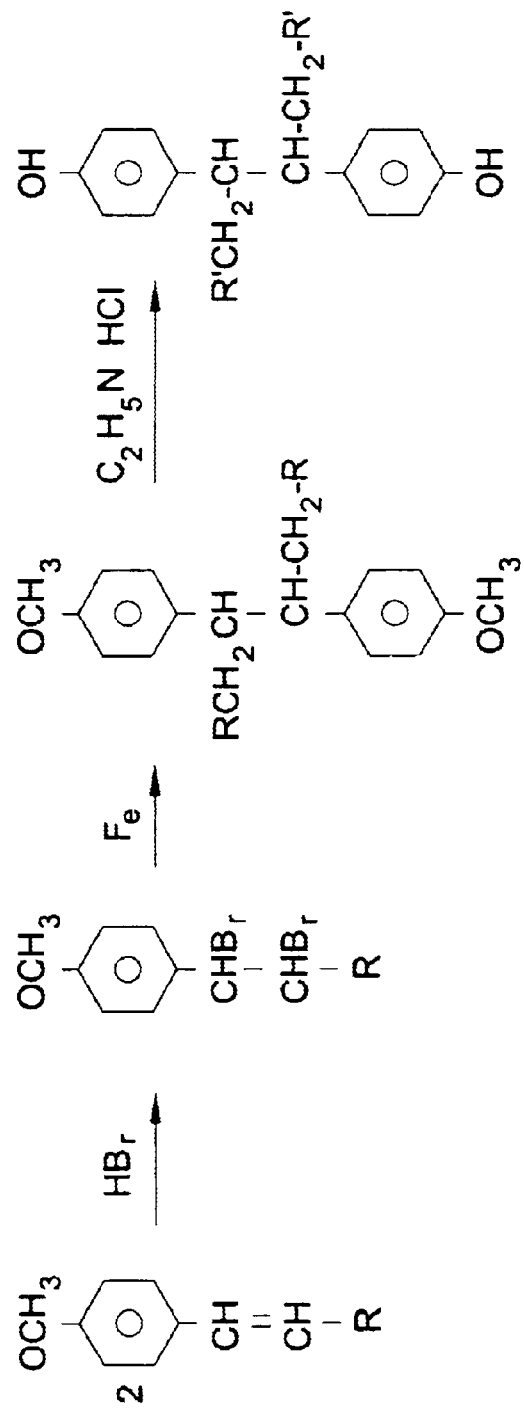

FIG. 2B. Alternate route formation of an alkyl phenol followed by reaction of the alkyl phenol via the alkyl group.

Figure 3:
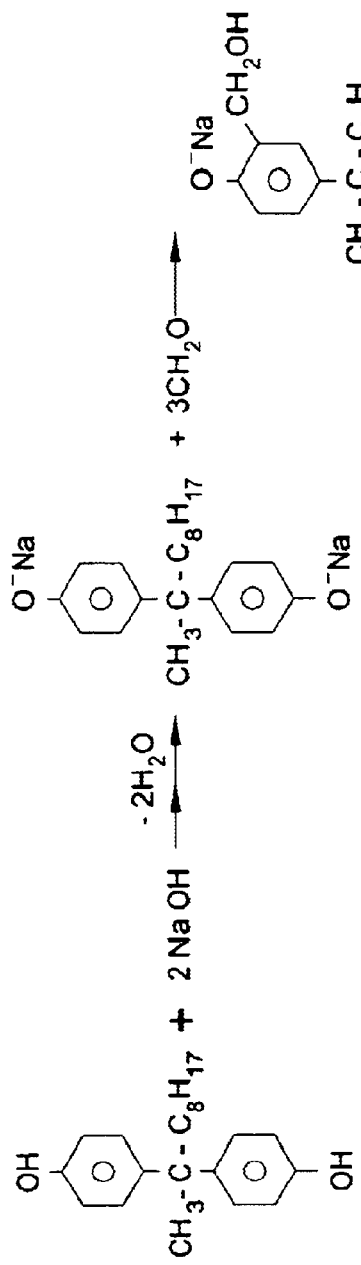

FIG. 3. Methylolation reaction of the dialkyl diphenol with sodium hydroxide then formaldehyde (any aldehyde) to join the methylolated dialkyl diphenol.

Figure 4:
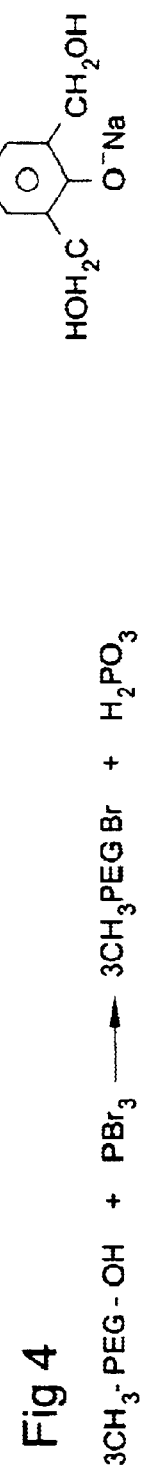

FIG. 4. MPEG is melted with phosphorous tribromide.

Figure 5:
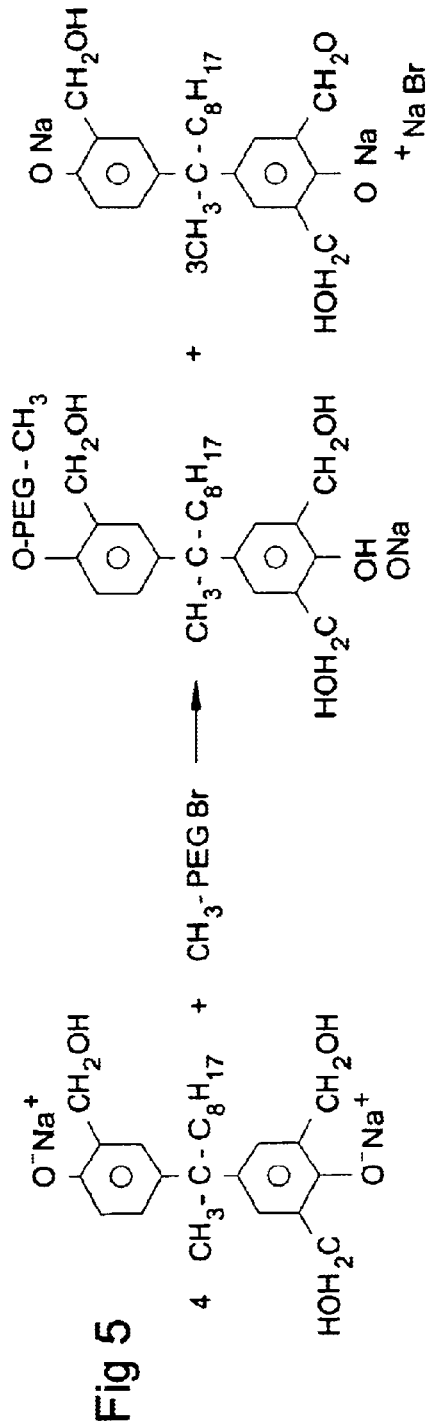

FIG. 5. Products of reactions shown in FIGS. 3 & 4 added slowly together. Monoalkyl PEG bromide reacted with the methylolated dialkyldiphenol via Williamson ether synthesis to join the monoalkyl PEG ether of the methylolated dialkyl diphenol. Four fold stoiciometric excess of the dialkyl diphenol relative to the quantity of PEG or PEG derivative reacted, and where one or both alkyl groups are C sub 8 hydro carbons chains.

FIG. 6. Representative reactions to affect cross linking of methylene bridges and methoxy ether bridges between the methylol groups and a ring carbon from the phenol-aldehyde resole.

Figure 7:
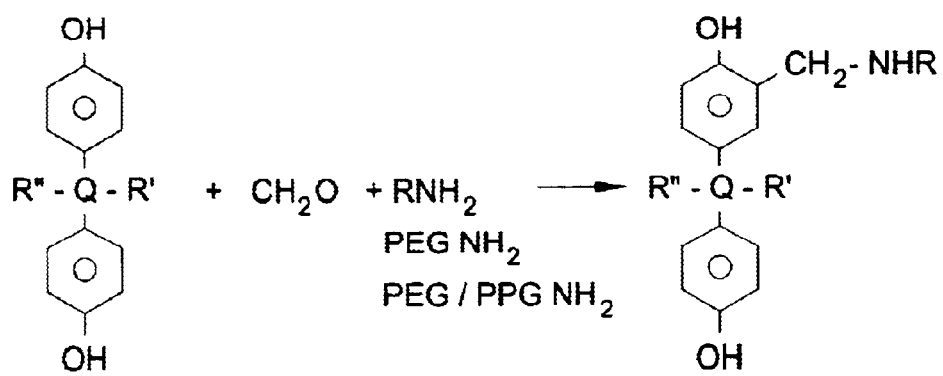

FIG. 7. Use of aminoalkylation (Mannich base) to generate polymer having the functional moiety bound to the ring via a methylene group and amino nitrogen.

Figure 8:
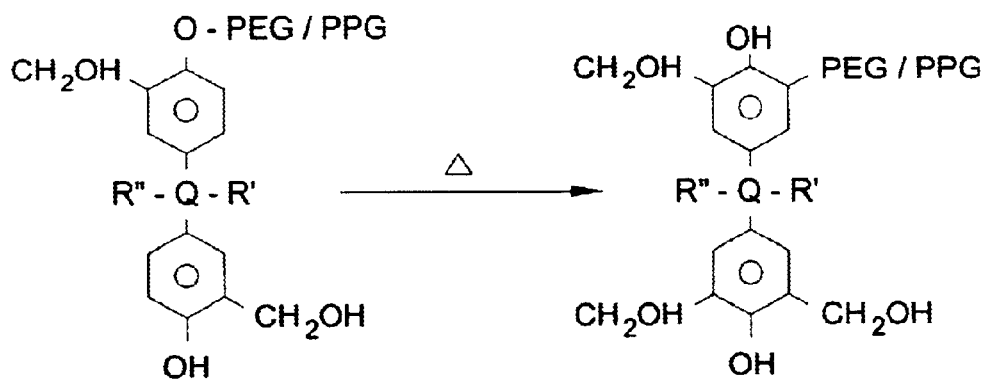

FIG. 8. Fries rearrangement of dialkyl diphenol PEG ether.

Figure 9:
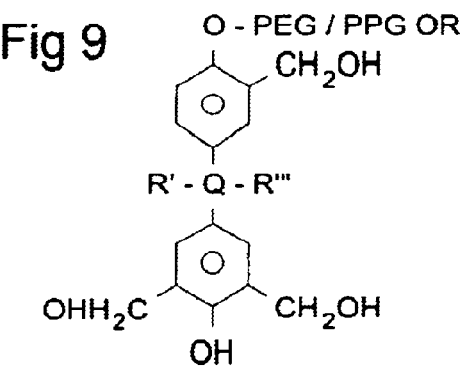

FIG. 9. The preferred embodiment of the present invention.

Figure 10:
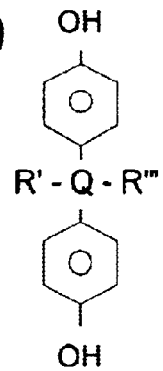

FIG. 10. The most simplistic embodiment of the present invention which would use bisphenol A as the initial substrate where R' and R" are methyl ($CH_3$) and Q is a single carbon (C).

Figure 11:
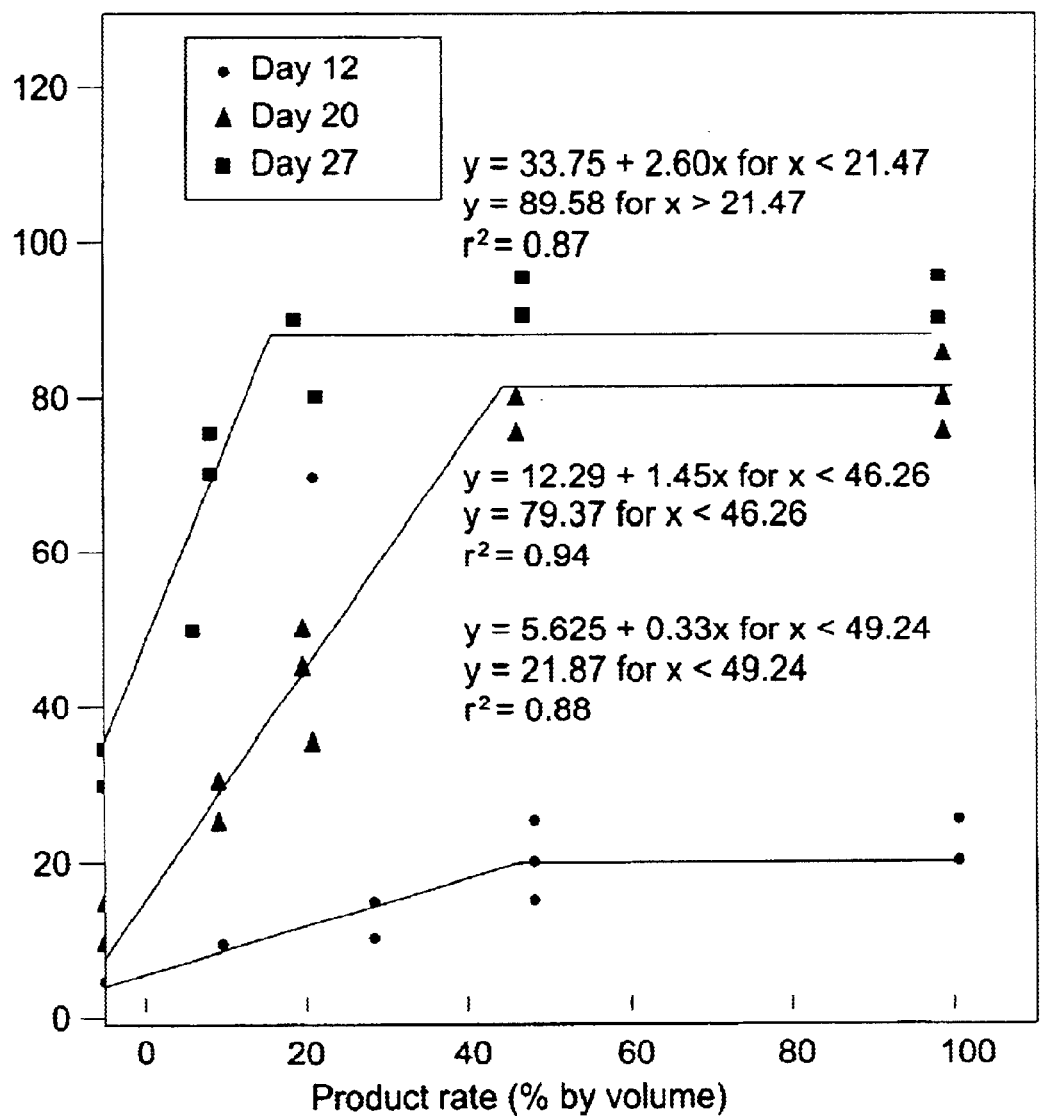

FIG. 11. Shown is the effect of the present invention on rate of coverage of Bermuda grass.

Figure 12A:
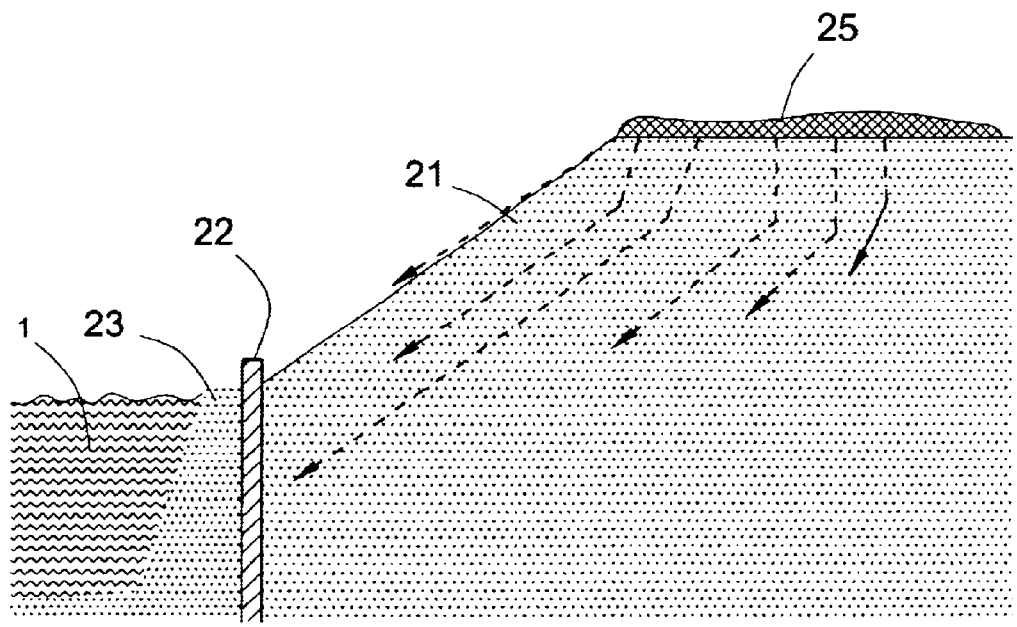

FIG. 12A. Shown is a diagram depicting a SPMS polymer comprising barrier for the prevention of surface water contamination by organic compounds. Movement or leaching of the organic compound is shown as dashed lines with arrows. 21 represents soil. 22 represents a SPMS polymer comprising barrier. 23 represents bedrock. 24 represents water. 25 represents an organic compound spill or application.

Figure 12B:
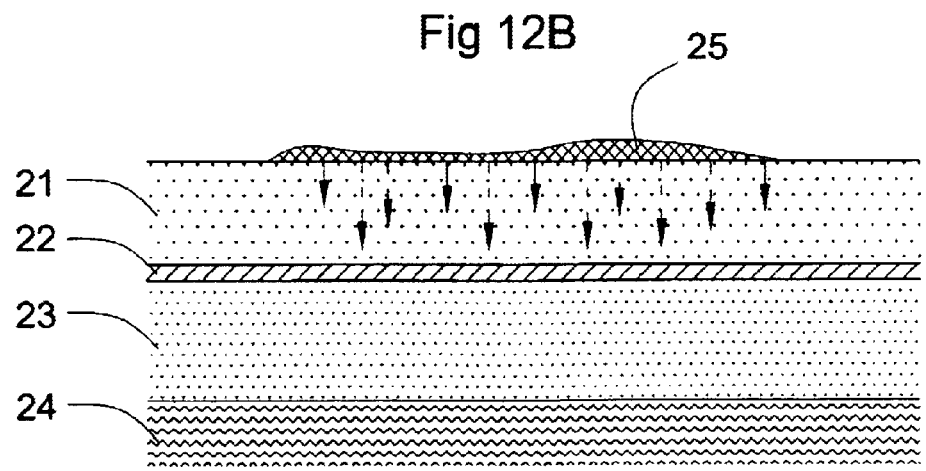

FIG. 12B. Shown is a diagram depicting a SPMS polymer comprising barrier for the prevention of subterranean water contamination by organic compounds. Movement or leaching of the organic compound is shown as dashed lines with arrows. 21 represents soil. 22 represents a SPMS polymer comprising barrier. 23 represents bedrock. 24 represents water. 25 represents an organic compound spill or application.

Figure 13:
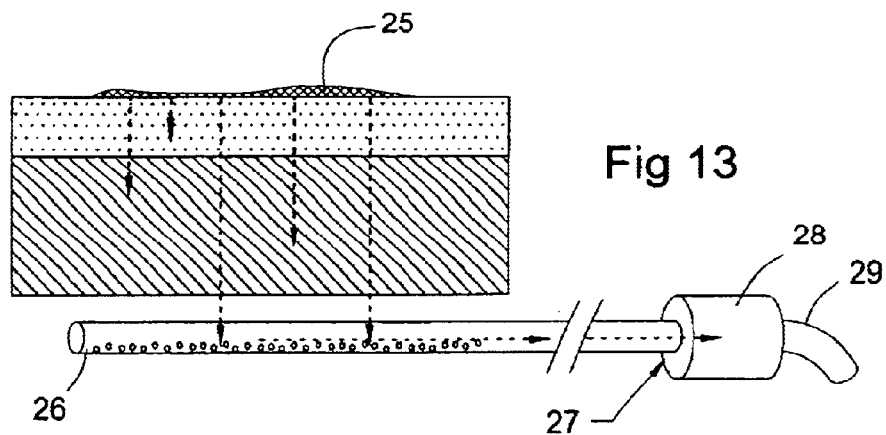

FIG. 13. Shown is a diagram depicting an underground drainage system operatively connected to a filtering device comprising an SPMS polymer composition. Movement or leaching of the organic compound is shown as dashed lines with arrows. 25 represents an organic compound spill or application. 26 represents an underground drainage pipe. 27 represents the inlet means to the filtering device. 28 represents the filtering device comprising an SPMS polymer composition. 29 represents an outlet device.

Figures 14A, 14B:
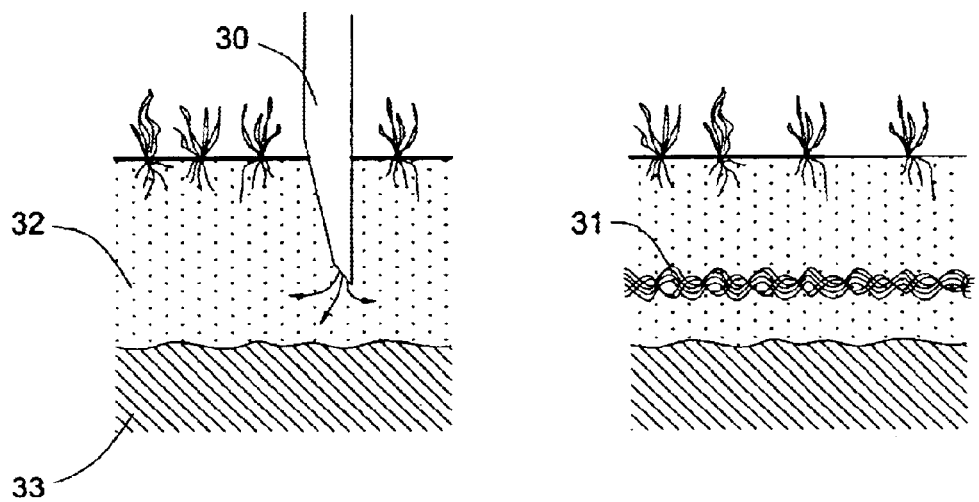

FIG. 14A. Depicted is a spike injecting an SPMS polymer composition into the soil at a discrete layer. 30 indicates the injecting spike. 32 indicates the root zone. 33 indicates the intermediate layer.

FIG. 14B. Depicted is the soil after application by injection of the SPMS polymer composition into a discrete layer as shown in FIG. 8A. In this example the SPMS polymer is a discrete layer within the root zone. 31 represents the SPMS polymer composition in the lower root zone.

Figures 15A, 15B:
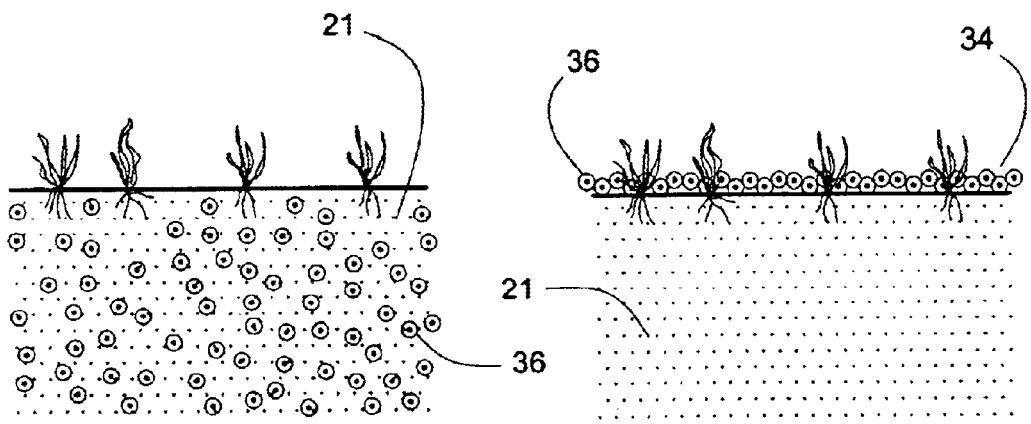

FIG. 15A. Shown is a diagram depicting the SPMS comprising in use as a soil mixture amendment throughout the entire golf green even into the root zone 21, at time of construction of golf green. 36 represents the SPMS soil amendment mixture having clay or other ion exchange material adhered to the sand via the polymer.

FIG. 15B. Shown is a diagram as in 15A only depicting the SPMS composition 36 in use as a soil amendment top dressing, 34.

5.0 DETAILED DESCRIPTION OF THE INVENTION

The present invention is a solid phase mixed solvent polymer which possesses polar, non-polar and cation exchange functionality to adsorb and contain pesticides or other organic compounds at the source of the spill or their application. The present invention has the ability to sorb and retain organic compounds, inorganic ions and their residues having a wide range of polarities, is inexpensive to manufacture, and easy to implement. The SPMS-sand compositions of the present invention do not significantly affect the conductivity or percolativity of the soil in which they are mixed or to the sand on which they are applied. These qualities make them highly useful in areas that require efficient draining of water such as with athletic turf or a golf green. Further, the SPMS polymer compositions of the present invention enhance plant growth through retention of moisture and nutrients following fertilization. It is also believed that the sorbed pesticide will retain its efficacy and continue to be beneficial for the original purpose intended if retained in the root zone as opposed to beneath it.

Coating a substrate with one or more of the disclosed SPMS polymer formulations provides an easy means to develop devices for the purification and remediation of aqueous solutions, including sludge, sewage, groundwater, surface water, and municipal water supplies. The simplicity and cost-effectiveness of the present invention in preparing barriers, flow through filtration apparatus, and the preparation of devices for contacting the SPMS-substrate compositions with an organically-contaminated aqueous source enhances usefulness with many existing water treatment devices or to adsorb organic contaminants from solution. Finally, the ability of the SPMS polymer compositions to slowly leach or desorb the bound organic compounds make them useful as an adjuvant or a delivery vehicle for the controlled release of organic compounds including herbicides, organic pesticides (including nematicides, insecticides, fungicides, and microbicides) to a target area. Moreover, the coating ability (adhesiveness) of the SPMS polymer onto a biofriendly inert substrate, such as a mineral, silicate, or sand particle, provides a biocompatible matrix for not only the delivery of slow-release fertilizers or pesticides to a target area without introducing incompatible or unsuitable adjuvants or substrates into the environment, but also to enhance cation and anion exchange, and moisture and nutrient retention capacities of the soil without concurrent reduction in percolation rate.

The invention can be described as a solid phase mixed solvent polymer comprising polyoxyetheralkyldiphenol formed from the reaction between at least one polyoxyether and at least one alkyl diphenol, and a phenol-aldehyde resole, wherein the polymer comprises crosslinkages between the resole and the polyoxyetheralkydiphenol.

More specifically the polymer, a dialkyl diphenol PEG or PEG/PPG ether, the general formula for which is (FIG. 1) where R, R', R" and Q are of variable chain length and functionality, is synthesized from a suitable PEG or PEG/PPG monoether and a suitable dialkyl diphenol. The present invention affords virtually unlimited flexibility insofar as the range of absorbable compounds targeted. The ability of the present invention to adsorb target compounds is a factor of the synergistic cosolvency of the R, R', R", Q groups in conjunction with a PEG or PEG/PPG ether moiety, such as polyethylene glycol (PEG), methoxy PEG (MPEG), polypropylene glycol (PPG), PEG/PPG, ethyl PEG, propyl PEG, butyl PEG, ethyl PEG/PPG, PEG esters and PEG/PPG esters. The use of polyethylene glycol-polypropylene glycol copolymer, or the monoalkyl ether, and by careful selection of the PEG/PPG ratio within the copolymer, enhancement of the adsorbent properties of the final polymer can be seen relative to the solute of interest. These permutations are nearly limitless.

Enhanced solubility of a solute in mixed solvent systems has been described in the literature and predictive models have been developed (e.g. uniquac, unifac and nibs). These models use dielectric constant and volume fraction of each component solvent to predict the Increase in solubilization of a solute in free solution. Unexplained discrepancies between predicted solubility and experimentally determined solubility which suggest synergistic cosolvency effects on solubilization of solutes have been alluded to in the literature. See, P. Suresh C. Rao, Linda S. Lee, Rodolfo Pinal, Cosolvency and Sorbtion of Hydrophobic Organic Chemicals, Environmental Science and Technology, Vol. 24, No. 5, 1990, pp. 647–654.

Research on cosolvency has focused on single phase, homogeneous liquid mixed solvents and the effects of component concentration on the solubility of solutes. Two immiscible solvents cannot cosolvate a solute.

The effect of "partially miscible organic solvents" (PMOS) on cosolvency was studied by Rodolfo Pinal, P. Suresh C. Rao, Linda S. Lee, Patricia V. Cline, Cosolvency of Patially Miscible Organic Solvents on the Solubility of Hydrophobic Organic Chemicals, Environmental Science and Technology, Vol. 24, No. 5, 1990, pp. 639–646, who found that cosolvency in these systems depended in large part upon the extent of solubility of the PMOS in the bulk solvent. In systems involving PMOSs with negligible solubility in the bulk solvent no augmentation of solubility of a solute due to cosolvency was observed.

Polyoxyethers and alkyl hydrocarbons in liquid phase are immiscible. The cosolvency effect of these two solvents of extremely differing polarities has not been investigated since because they are immiscible and it is assumed that they cannot act as a cosolvent system.

The current invention pertains to a solid phase mixed solvent system (SPMS) in which two or more solvents are covalently bound to an insoluble polymer surface. These solvents may or may not be miscible in liquid phase These solvent molecules are long, flexuous moieties which are oriented on the polymer surface in a sterically favorable geometry which facilitates their mutual interaction with the solute molecule and each other.

Due to the differing polarities of these solvents, their long flexuous nature, and their sterically favorable orientation the solvent moieties can interact in a relatively unhindered fashion, analogous to free solution, such that the more polar loci of the solute molecule can associate via polar forces with the polyoxyether moiety and the non-polar loci within the solute molecule can associate with the alkyl moieties via dispersive forces.

This dual interaction enhances the thermodynamic stability of the solute-solvent interaction which manifests as a greater than expected partitioning of the solute on the SPMS matrix.

The new polymer compound retains an unreacted phenolic hydroxyl group which allows the crosslinking with the resole to proceed unhindered (i.e., no deactivation). In this case the resole acts as an inert anchor for the polyoxyethylene dialkyl diphenol PEG/PPG ether.

Increasing the pH of the resole is not required which eliminates the problems associated with premature polymerization of the resole and destabilization of the phenolic matrix.

The final polymer possesses enhanced stability vis a vis the compound to be absorbed which is associated with a synergistic co-solvency consisting of 1) polyoxyether which associates with the more polar compounds or loci, and 2) long chain alkyl groups which associate with the less polar compounds or loci. The polarity of the polymer molecule can be modified by changing the length of the alkyl groups. Additionally, the flexible, pendant long chain alkyl groups and the pendant long chain polyoxyether can interact in a sterically unhindered fashion with the solute molecule. The leachate from this polymer is nearly colorless and does not foam, which indicates a more thorough polymerization and a more complete crosslinking with the resole component.

5.1 SPMS Polymer Compositions

The SPMS polymer compositions of the present invention are able to bind organic compounds having a wide range of polarities, can be inexpensively manufactured, and coated onto a variety of substrates. These solid phase mixed solvent polymer compositions are characterized as a polyoxyetheralkyldiphenol formed from the reaction between at least one polyoxyether, at least one alkyl diphenol, and a phenol-aldehyde resole, wherein the polymer comprises crosslinkages between the resole and the polyoxyetheralkydiphenol, and is bound to a matrix. The use of the pre-polymer as an adhesive to bind small particles to the surface of the sand, the chemistry associated with those particles can be imparted to the SPMS polymer composition. For example, clay can be bound to the surface of the sand thus imparting cation exchange capacity, some anion exchange capacity, as well as water holding capacity without a concurrent reduction in percolation rate associated with clay particles occluding the soil pores. Other examples of possible particulates include zeolite, manganese dioxide, titanium dioxide, iron oxide or hydroxide, and synthetic strong anion exchange materials.

While the facility and utility of SPMS polymer matrix formulations comprising methylolated dialkyl diphenol alkyl PEG/PPG ether (or other polyoxyether) is in adsorbing organic pesticides, Insecticides, fungicides, herbicides and nematicides, it is also contemplated that by varying either the concentration of one or more of the substrates during formulation, or by substituting other derivatives of these compounds that additional SPMS polymer compositions that also function as organic adsorbants can be developed. Thus, each of the modified SPMS polymer formulations may be useful in the methods of the present invention, and are therefore within the scope of the invention.

5.2 Methods of SPMS Polymer Production

The synthetic route to the SPMS polymer of the present invention includes:

1. Synthesis of a ketone

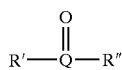

where R' and R" may have specific functionality or the synthesis of the alkyl phenol ester or ether;

2. Reacting the ketone with phenol forming the dialkyl diphenol or reacting the alkyl phenol via the alkyl groups thus forms the dialkyl diphenol;

3. Methylolation—reacting the dialkylphenol with an aldehyde under controlled conditions;

4. Reaction of monoalkyl ether of PEG or PEG/PPG with phosphorous tribromide thus forming the monoalkyl PEG or PEG/PPG bromide;

5. Reaction of the monoalkyl PEG or PEG/PPG bromide with the resole (FIG. 4) via the Williamson ether synthesis thus forming the monoalkyl PEG or PEG/PPG ether of the methylolated dialkyl diphenol;

6. The product of step 5 above is then mixed with a commercial phenol-formaldehyde (PF) resole then coated onto sand with the appropriate particle size distribution; and 7. Clay, zeolite, manganese dioxide, titanium dioxide, metal oxides or hydroxides, or strong ion exchange resin is then mixed intimately with the resole coated sand and the resulting composition is thermoset.

The ketone may be purchased from a commercial source, isolated as a natural product, or synthesized. Typically, although not exclusively, the ketone will be of high molecular weight and polyfunctional. It may contain functional sites such as unsaturation, which would allow further reaction to form even larger polyfunctional structures. In the case of a monoketone, Q will always be a single carbon but it may be desirable to use a diketone or polyketone which would allow reaction with more than two moles of phenol. R' and R" may or may not be the same alkyl and may contain aryl, amine, amide, carboxyl, imine, hydroxyl, ester, ether, keto, vinylic, halo, cyano, nitro, etc. Alternatively, the ketone may be produced via the oxidation of a secondary alcohol.

After synthesis of the ketone, further modification may be performed, for example, if R is methyl:

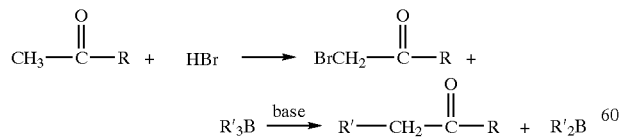

Another example of a modification to the ketone includes alkylation via inimines.

Other methods for producing the ketone include heating a group II salt of a carboxylic acid or by the acetoacetic ester synthesis, Aldol condensation or Blaise ketone synthesis.

The dialkyl diphenol is the preferred precursor to the final polymer which may be synthesized by condensation of the ketone with phenol directly. An alternative route, however, might include the formation of an alkyl phenol followed by reaction of the alkyl phenol via the alkyl group.

The synthesis of the alkyl phenol could occur by Friedel-Crafts alkylation but the preferred embodiment would be by Friedel-Crafts acylation followed by Fries rearrangement. The resulting product would then be reduced via Clemmenson or Wolfe Kirshner reduction.

Co-polymerization of an alkylphenol with PEG/PPG-phenol within the phenol-formaldehyde matrix would generate a compound in which the PEG/PPG and the alkyl (i.e. R, R', R", and Q) would not be on the same monomer, however, the synergistic cosolvency might be similar. See FIG. 9.

The synergistic co-solvency is due primarily to the simultaneous interaction of the polyether and alkyl with the corresponding loci on the same solute molecule. Thus the polyether and alkyl groups must be located in close proximity to each other as well as the solute molecule. This can only be insured if the copolymer of definite structure contains both the polyether and alkyl groups. If an alkyl monomer is mixed with a polyether monomer and resole, the location of the functional groups is randomly distributed with the polymer domain. Some statistical distribution of the polyether and alkyl groups would exist of which some proportion (albeit small) would exhibit synergistic interaction with the solute. The end product would not be as efficacious as the preferred embodiment.

Aminoalkylation (Mannich base) would generate a derivative SPMS polymer compound where the functional moiety is bound to the ring via a methylene group and amino nitrogen. This type of compound could likely have similar functionality but maybe more susceptible to environmental biodegradation. See FIG. 7.

The methylolation reaction of the dialkidiphenol with formaldehyde (any aldehyde) forms the methylolated dialkyldiphenol. See FIG. 3. Typically, the formaldehyde to diphenol ratio is from about 2:1 to about 3:1. After addition of the appropriate amount of formaldehyde, the reaction is maintained at approximately 60 degrees Centigrade until the formaldehyde level falls below 0.1%, usually about 24 hours. See FIG. 8.

Following methylolation, in the preferred embodiment, the methylolated product is reacted with the PEG/PPG Br thus forming the methylolated dialkyl diphenol PEG/PPG ether. The ethyoxylate bromide might be PEGBr, PEG/PPGBr, or a monalkylated derivative of these. See FIG. 5.

In the preferred embodiment the bromination occurs via phosphorous tribromide which functions better than does NaBr and sulfuric acid. Use of the phosphorous tribromide eliminates this problem the cleavage by hydrogen bromide of the ether bonds associated with the ethyoxylate. See FIG. 4.

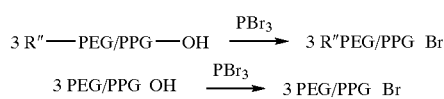

The resulting ethyoxylate bromide is then added slowly (10% wt.) to a stoiciometric excess of the methylolated dialkyl diphenol with vigorous stirring. The reaction is maintained at 70 degrees Centigrade for one hour. After the completion of the addition, the result of this reaction is the methylolated dialkyl diphenol alkyl PEG/PPG ether. Also, Cleissen rearrangement may occur but this would not alter the fundamental chemistry of the SPMS polymer.

The etherification reaction may be carried out prior to methylolation. The absence of the phenolic hydroxyl hydrogen in the phenolic ether prevents the methylolation of that ring as well as subsequent coupling of the ring into the resole matrix. If only one of the diphenol rings is etherified, then the other ring can still undergo methylolation and coupling. This may result in a less stable final polymer because only one ring of the diphenol is anchored to the resole matrix. If this is the intention, methods to increase the probability of etherifying only one ring of the diphenol include: i) adding half the stoiciometric amount of sodium hydroxide needed to fully ionize the diphenol, ii) using sodium or potassium carbonate instead of the hydroxide, or iii) protecting one of the rings with, for example, tertbutydimethylsilyl (OTBS) chloride and imidazole. After etherification with PEG/PPGBr, the OTBS ether can be converted back to the phenolic hydroxyl via tributylammonium flouride.

The problem with etherifying prior to methylolation is the formation of at least some diphenol dialkyl diether. The diphenol diether will not undergo methylolation or coupling with the bulk of the resole and thus remains water-soluble.

An understanding of the overall conceptual reaction can be seen in base catalysis reactions which begin when phenol is deprotonated by the base catalyst. The negative charge is accommodated by resonance forms with the charge on two ortho positions and the para position of the ring. These three structures cause phenol to be trifunctional.

The reaction can occur again at the remaining activated positions. The result is a mixture of all of the possible "methylol" compounds, mono-, di-, and tri-substituted.

Further reactions produce methylene bridges or methylene ether bridges at any of the possible positions. At early stages of the reaction, highly branched, oligomeric compounds form that are still soluble. Later on, the mixture is heated strongly to complete the reaction. The result is a highly cross-linked, irregular structure.

Next in the sequence, approximately 10% by weight of the methylolated diphenol dialkyl ether is pumped into a mixer, until thoroughly blended with the phenol-formaldehyde (PF) resole. This mixture which the inventor refers to as "resin" is then coated onto sand of the appropriate particle size, preferably all particles passing a 10 mesh screen and 90% being retained on a 60 mesh screen.

After the sand is completely covered with the resin, preferably about 10% by weight, in the range of about 2–20% by weight, finely divided clay, manganese dioxide, iron oxide or hydroxide, and/or titanium dioxide is slowly added to the agitating sand. When all the finely divided material is absorbed onto the sand, the product is thermoset at preferably about 150 degrees centigrade (in the range of about 100–220° C.) for preferably 45 minutes (in the range of about 10–120 minutes) to effect cross-linking of the polymer. This final product is pH adjusted with acid (e.g. hydrochloric, acetic, sulfuric, etc.) to a pH between about 4–8, preferably 6, and washed free of fines. Alternatively, the final polymerization can be acid catalyzed which eliminates the need for 150° C. curing temperature, however, this is not preferred because the pH needed to effect polymerization is deleterious to the clay or other coatings.

Thus, a final product is produced which will absorb targeted organic compounds including pesticides, fertilizer cations including potassium and ammonium, fertilizer anions including orthophosphate, polyphosphate, arsenate, etc.

If manganese dioxide were used to coat the sand, fertigation with hydrogen peroxide would result in the production of oxygen in the soil profile. Plant roots could greatly benefit from this introduction of oxygen within the root zone.

The present invention has four different modalities. Three of these pertain to the polarity of the polymer and the fourth to the caion exchange capacity associated with the clay particles which are bound to the surface of the sand particle using the polymer as an adhesive.

The most polar component of the present invention is the polyether, RPEG, RPEG/PPG or e.g. methoxy PEG (MPEG) which acts as a solid phase solvent of intermediate polarity. Polar solutes or loci sorb to the polymer RPEG or RPEG/PPG. The present invention is the product of a reaction between polar polymer, RPEG or RPEG/PPG, and non-polar dialkyldiphenol to form an RPEG or RPEG/PPG polymer derivative which is then co-polymerized with an inert substrate polymer, phenol-formaldehyde.

The phenol-formaldehyde matrix can also be considered a moderately polar phase. The polymer is not macroporous and, as such, does not have the large surface area which would make the effect of this phase significant in sorption of analytes. Although phenol-formaldehyde may be formulated for use in the SPMS polymer, the inventor has determined that commercially available phenol-formaldehyde resin (Bordon Chemical, Louisville, Ky.) is quite effective for production of an inexpensive, effective adsorbent. However, the inventor contemplates that variations may be made concerning the type of phenol formaldehyde (PF) or use of compounds chemically similar to PF and still remain within the scope of the present invention. There are different commercial grades of phenol formaldehyde resins. Mixes of resole with novalac-grades of PF have been used in industry for many years because of improved properties along with less excess formaldehyde. However, owing to the functional nature of resole, it may not be desirable to replace all of the resole PF with a novalac grade of the resin.

The third polymer phase is attributed to R' and R", the alkyl groups. These groups would typically be long chain flexuous hydrocarbon from about C sub 1 to about C sub 21 in length which can Interact with the analyte in a sterically unhindered fashion. While other functionality may be imparted to them, the preferred embodiment would be hydrocarbon, and thus, quite non-polar.

The present invention has a synergistic functional effect of the MPEG and long chain alkyl groups. Nearly all organic molecules contain centers of charge (polar groups) as well as non-polar (e.g., hydrocarbon) regions. The use of long flexuous functional groups in the present invention allows the polar regions of the molecule to freely associate with the MPEG and the non-polar regions of the molecule to freely associate with R, R' and R" thus enhancing the affinity of the molecule of interest for the polymer matrix in a synergistic fashion. Due to the flexible nature of these functionalities, there is the lack of steric hindrance in the fitting of the molecule of interest within the MPEG and R, R' and R' regions of the polymer matrix of the present invention. By varying the length and proportion of the various functional groups it is possible to target a wide spectrum of solutes to sorb. Thermodynamically, the result is a highly stable solvation of the compound of interest. The proximity between the polar and non-polar groups is determined by the structure of the RPEG or RPE/PPG (or MPEG) derivative which is believed important to the overall sorption efficiency of the polymer.

The other mixed mode SPE products utilize polymers (or silica) in which one or all of the functional components of their polymer are held rigidly within their matrix and thus cannot interact with the solute of interest. For example, in the case of U.S. Pat. No. 6,254,780 to Bouvier discloses, the relatively small polar biodegradeable N-vinylpyrrolidone (NVP) as bound to the polymer skeleton where its orientation is such that it can merely rotate. This orientation facilitates the surface water wetting of the rigid, non-polar structural component, divinylbenzene (DVB) and any interaction between the N-vinylpyrrolidone and a solute is restricted to that locus. The NVP interacts only with water thus facilitating the wetting of the DVB. Thus, a solute which was to interact with both the polar and non-polar portions of the polymer must fortuitously be of the proper size and charge distribution to fit. An imperfect fit would result in a less than optimally bound molecule and an inherently less stable system. The industrial use of divinylbenzene and styrene in production would not be practical. The cost of these chemicals as well as their toxicity, carcinogicity, flammability and volume of hazardous waste produced as a result of the polymerization process would make its use prohibitive.

The present invention uses polar MPEG, itself a polymer, which is reacted with the non-polar dialkyldiphenol. The resulting MPEG dialkyldiphenol derivative is not a polymerization. Not until the MPEG dialkyldiphenol is crosslinked (polymerized) within the resole polymer matrix does it become the useful polymer of the present invention.

The use of chemical modifications to the present polymer to impart ion exchange capacity decreases the stability of the polymer in the soil, however, the use of clay or zeolite circumvents this enhanced biodegradation rate and still imparts ion exchange capacity.

5.4 Uses of SPMS Polymer

Although the SPMS polymer compounds of the present invention have utility without being bound to a substrate, in preferred embodiments the SPMS polymer compounds of the present invention are bound to a matrix, support or substrate to form an SPMS polymer composition. The binding of the SPMS polymer to a matrix support of substrate may provide the compound with a physical property of the matrix support or substrate while being able to maintain the chemical properties of the compound. This property may be weight, size, stability, shape, pliability, or magnetism. Porous substrates can be used, although possibly less effective on a "quantity of polymer" basis. Surface area available to the aqueous phase is a good predictor of efficacy of the polymer for adsorbtion. Usually porous substrates result in a lot of polymer filling the pores and thus occluding them.

In the broadest sense, the SPMS polymer compositions are used in the adsorption of organic compounds. In preferred embodiments the compositions comprise an apparatus comprising one or more SPMS polymer compositions of the present invention that is able to remove organic compounds from the environment or contaminated aqueous solutions. These embodiments include sport fields, agricultural fields, lawns, filters, water treatment facilities, barriers, etc. In the most preferred embodiment, the apparatus is a golf course green. Essentially any apparatus comprising the disclosed SPMS polymer compound or composition and able to bind organic compounds is believed to be within the scope of this invention. The inventor further contemplates that the SPMS polymer compositions need not be a component of an apparatus and may be applied directly to an organic compound for purposes of adsorbing the compound.

5.5 Removal of Organic Compounds by SPMS Polymer

Various organic compounds represent potential sources for environmental pollution and are, therefore, targets for SPMS-based remediation. Because of the worldwide use of pesticides, the eventual emergence of these compounds in environmentally sensitive areas is nearly inevitable. The presence of these compounds in water sources leads to contact by wildlife and man. Although, as a general rule, herbicides are not as toxic to man as insecticides, rodenticides and nematicdes, each can accumulate in the body and kill when certain concentrations are reached. The inventor contemplates that the present invention in all of its embodiments will greatly decrease the level of organic pesticides in the environment. Below is a brief synopsis for reference only of such organic pesticides, however, those skilled in the art, are presumed familiar with them so a discussion in detail will not be provided.

A. Herbicidal Compounds

The present invention can be used to bind and prevent the dispersal of herbicidal compounds in the environment. Herbicidal compounds are primarily used for weed control and many are well known. Herbicides are basically grouped according to their chemical structure, which include but are not limited to e.g. the triazines, the phenylureas, the carbamates, the phenoxyalkanoic acids, the aryloxyphenoxypropanoic acids, (a/k/a phenoxyacids), the sulphonylureus, the uracils, the pyridazines, the amides, the dinitroanilines, the benzonitriles, triazinone, the cyclohexanediones, and others (Tekel and Kovacicova, 1993; Tadeo el al., 1996; Gronwald, 1994). Since the preferred apparatus is a golf green, herbicidal compounds commonly used on USGA golf greens and their properties can be found listed at the internet address htt)://www.usga.ora/oreen.

B. Insecticides

The present invention may be useful to bind insecticidal compounds and prevent the dispersal of these compounds in the environment. Aldicarb, Allethrin, Ambush, Aminocarb, APM, Basudin, Bloallethrin, Bioremethrin, Biphenthrin, Bufencarb, Butacarb, butoxide, Carbanolate, Carbaryl, Carbofuran, Cinerin 1, Cinerin 11, Counter, Cyfluthrin, Cygon, Cyhalothrin, Cymbush, Cypermethrin, Cythion, Dasanit, Decis, Deltamethrin, Diazinon, Dibrom, Dimethoate 480, Dioxacarb, Dipet, Dyfonate, Dylox, Endosulfan, Ethidimuron, Fenpropathrin, Fenvalerate, Flucyrintae, Fluvalinate, Furadan, Guthion, Hopper Stopper, Imidan, Jasmolin 1, Jasmolin 11, Lagon, Lannate, Lorsban, Malathion, Metasystox-R, Methomyl, Methoxychlor, Mexacarbate, Monitor, Ortho, Oxamyl, Parathion, Permethrin, Piperonyl, Pirimor, Pounce, Promecarb, Pyrethrin 1, Pyrethrin 11, Pyrinex, Resmethrin, Ripcord, Sevimol, Sevin, Sniper, Supracide, Tetramethrin, Thimet, Thiodan, and Tralomethrin are among the compounds that have been utilized recently for insect control (Chen and Wang, 1996; Yang et al., 1996, ) http://www.gov.sk.ca/ajfood/cpg/iccont.htm). Insecticidal compounds commonly used on USGA golf greens and their properties are listed at the internet address http://www.usga.org/green/table3.html.

C. Fungicides

Fungicide use and the dispersal in the environment also represents a potential biological hazard. Fungicides such as Benomyl, Captan, Chlorothalonil, Copper Sulfate, Cyproconazole, Dodine, Flusilazole, Fosetyl-Al, Gallex, Mancozeb, Metalaxyl, Prochloraz, Propiconazole, Tebuconazole, Thiophanate Methyl, Triadimenol, Tridimefon, Triphenyltin hydroxide and Ziram have been utilized (Shishkoff, http://www.bonsaiweb.com/forum/articles/arts/fimgicide.html; http://cygnus.tamu.edu/Texiab/Nuts/Pecan/pecanf.html; Hollomon, 1993). Additional, fungicidal compounds, including trade and common names, may be found in Table 2 (http://www.missouri.edu/~extbsc/ turf/fundesc.htm, incorporated herein by reference). Areas such as agricultural, turf, and sport fields (golf course, tennis lawns, etc.) frequently are treated with substantial amounts of organic fungicides. Fungicidal compounds commonly used on USGA golf greens and their properties are listed at the internet address http://www.usga.org/green/table3.html.

D. Nematicides

The present invention may also be used to bind and prevent the dispersal of nematicide compounds in the environment Nematicidal compounds are numerous, the identity of which can be found at http://www.acesag.aubum.edu/depart/ipm/ Nematode.htm and http://www.missouri.edu/~extbsc/turf/fundesc.htm, both incorporated herein by reference. Many of the nematicidal compounds that are commonly used on USGA golf greens and their properties are listed at the internet address http://www.usga.org/green.

Fenamiphos, is one such nematicide, an anticholinesterase compound, (Nemacurg, Bayer Crop Protection, Kansas City, Mo.) widely used for nematode control on soils, and in particular golf course greens and fairways. There are few labeled alternatives to this pesticide. Snyder and Cisar (1993) observed considerable leaching of fenamiphos metabolites (sulfoxides and sulfones) following fenamiphos application to a USGA green. Leaching of the metabolites, and to a lesser extent the parent compound, greatly exceeded that of all other organophosphates examined (Snyder and Cisar, 2001 and 1995, ; Snyder, Elliott and Cisar, 2001). Because fenamiphos has been observed in waters in or adjacent to golf courses (Swancar, 1996), and because of a highly-publicized fish kill (Zaneski, 1994), regulations have been issued for limiting fenamiphos use on golf courses.

5.6 Industrial Remediation

The chemical nature of the present invention provides for its ability to bind a large variety of organic compounds, besides pesticides. It is therefore, contemplated that the present invention may be used to bind organic compounds to prevent their dispersal in the environment, facilitate the "cleanup" of such compounds in the event of a spill, and to remove an organic compound from a solution.

U.S. Pat. No. 4,147,624 to Modell discloses a list of organic compounds that are removable from a water stream by adsorption on polymeric adsorbents and is incorporated herein by reference. It is contemplated that the compounds, compositions, and methods of the present invention may be used to remove from an aqueous solution one or more compounds listed in the Modell patent.

5.7 Spill Cleanup

The present invention also provides for a simple, economical method for cleaning up spills at the source, by application of the present invention to the spill as an adsorbent compound. This compound, applied as a particulate, such as sand, clay, granular, etc., may be used to adsorb more substantial industrial spills. After application, the adsorbent may be collected and disposed of without the worry of the compound being dispersed into the environment following disposal. The particulate may be applied directly to the spill or as a physical barrier, e.g. around the perimeter of the spill. This barrier would essentially function to contain the spread of the spill.

A common remediation technique is to supply nutrients (fertilizer) to the microflora which then use the pollutant as a carbon source thus effecting if s chemical breakdown. The use of this composition would allow the pollutant to be immobilized via the polymer as well as the fertilizer nutrients.

In another embodiment, the current invention may be used as part of a barrier to prevent one or more organic compounds or pesticides from entering surface water. The barrier may be a fence or wall-like structure that is placed between the spill, or area of application, of one or more organic compounds or pesticides and surface water (FIG. 2A). The surface water may be a puddle, creek, river, reservoir, pond, lake, sea, ocean, etc. The present invention may also be used to prevent one or more organic compounds from entering subterranean water (FIG. 2B).

In an exemplary embodiment, the inventor contemplates that the compositions of the present invention may be used as an amendment to the soil surrounding an underground gasoline storage tank to reduce the impact of leakage on the environment. Of course, the compound stored underground may be other organic compounds and need not be gasoline.

5.8 Pesticide Management for Sports Facilities and Turf Grasses

Although use of SPMS polymers in numerous types of sports facilities is envisioned, the following discussion will focus on the preferred use in golf courses. The properties of the SPMS polymer compositions of the present invention, hydralic conductivity, inexpensive, structurally consistent with an ability to bind a wide variety of organic compounds, ease of application, uniform and adjustable size, etc., may make the compositions desirable as amendments to soils to sports fields besides those of a golf course, including but not limited to, tennis, croquet, polo, horse racing, football, baseball, soccer, cricket, etc. Pesticides are applied to golf course greens to help provide a suitable aesthetic and playing performance surface for golf.

The nature and design of golf courses prevent much of the pesticides from reaching ground and surface water, occasionally contamination of these waters occurs. Furthermore, even residual contamination may accumulate over time. Therefore, any measures that may be taken to reduce the environmental Impact of the application of pesticides to golf courses should be considered.

A golf course may be designed comprising one or more SPMS polymer compositions of the present invention to decrease the level of pesticides or their metabolites from entering ground and surface water. The SPMS polymer compositions may be added as an amendment to or mixed with one or more layers of the sand or soil of a golf course or may be a component of a water treatment system or filter through which the water of a golf course flows.

A critical problem with the design of a golf course is maintaining high percolativity or high rate of conductivity. It is desirable that water applied to a course readily pass through the soil. Prior attempts have been made to add clays, thatch, etc. to subterranean layers of a golf green, but these materials were shown to decrease the conductivity of the green and, therefore, were undesirable. When used as a soil amendment, it is contemplated that one or more SPMS polymer compositions of the present invention may be added to any of the subterranean layers, most preferably to golf greens. The subterranean layers of a USGA golf green are well known in the art and include, starting at the surface and Increasing In depth: the root zone, the intermediate layer, and the gravel drainage blanket in preferred embodiments, one or more SPMS polymer compositions of the present invention comprise any of these layers of a golf green. Although one or more SPMS polymer compositions of the present invention may comprise the entire root zone and can serve to enhance oxygenation, moisture retention and maintenance of nutrients after fertilization.

There are a number of methods by which the subterranean layers of a golf green may be amended by the compounds and compositions of the present invention. In one embodiment, one or more SPMS polymer compounds may be added to the material (sand, gravel, clay, silt, etc.) that makes up a subterranean layer of a golf green. In the most preferred embodiment, the SPMS polymer composition comprises sand. One or more subterranean layers of a golf green may consist of one or more SPMS polymer compositions or may comprise of a ratio of one or more SPMS polymer compositions to "unamended" material. In preferred embodiments, the ratio of SPMS polymer composition to "munamended" material is about 25% by volume.

A golf course green can be prepared so as to have the capacity to adsorb and retain solvated compounds and ions, to hold water, to enhance plant growth and to have ion-exchange capacity without substantial reduction of percolation rate in said green. One or more layers of the golf green is amended with a solid phase mixed solvent polymer composition, a polyoxyetheralkyldiphenol formed from the reaction between at least one polyoxyether, at least one alkyl diphenol, and a phenol-aldehyde resole. The resole and the polyoxyetheralkydiphenol, are then cross linked and bound to a matrix.

Although preferred embodiments of the present invention are golf greens comprising the SPMS polymer compounds and compositions, amendments to the soils of other sections of the golf course including, but not limited to, fairways, greens, tee boxes, rough, traps, ponds, range, etc. may also be made.

A. Soil Amendments

It is also contemplated that soil amendments comprising the SPMS polymer compositions of the present invention may be that of a lawn, agricultural field (i. e., garden, vineyard, pasture, crop, fruit or vegetable orchard, nursery potting soil, etc.), or any location that pesticides or other organic compounds are applied (i.e., industrial facilities, waste storage or treatment facilities, job sites, construction sites, chemical factories, weapon facilities, etc.).

Because the compounds of the present invention may be affixed or coated onto a number of substrates of different sizes and materials, it is contemplated that the compositions of the present invention may be used as an agronomic amendment to the soil or similar growth media in any instance when one desires to Improve the nature of the soil, or growth media such as, to increase the adsorption of organic compounds by the soil, to after the percolativity of the soil, or to alter the consistency of the soil, or to improve the ability of these soils and media to support plant growth, to enhance oxygenation, or to retain nutrients and moisture.

Such a soil amendment composition would result from the following method:

1) reacting a ketone with a phenol to form a dialkyldiphenol;
2) methylolating said dialkyldiphenol with an aldehyde;
3) reacting monoalkyl ether of PEG with phosphorous tribromide to form a monoalkyl PEG bromide;
4) reacting said monoalkyl PEG bromide with the methylolated alkyldiphenol via the Williamson ether synthesis to form a monoalkyl PEG ether of the methylolated alkyl diphenol;
5) combining a phenol-aldehyde resole with the monoalkyl PEG ether of the methylolated alkyl diphenol to form a mixture;
6) coating the mixture onto sand particles;
7) mixing a quantity of ion exchange material with said coated sand particles; and heating said coated particles to effectuate polymerization; and
8) adding the polymerized ion exchange coated sand particles to the soil to be amended.

B. Adhesive

The prepolymer can be used as an adhesive to affix clay, metal oxides, zeolites, or synthetic ion exchange polymers to the surface of the sand grains thus imparting desirable chemistries to the resultant sand. A pre-polymer is a macromolecule or oligomer molecule capable of entering through reactive groups into further polymerization.

While clay coated sand is known in the art, it does not retain the ion exchange capacity of the clay or the water holding capacity, primarily for cosmetic reasons and to avoid certain problems associated with using pure clay in these applications. These problems include dust, reduced water percolation, and the production of a slimy surface when wet. For example, U.S. Pat. Nos. 5,583,165 and 6,048,377 to Kviesitis teach the use of a polymer, e.g. polyvinyl alcohols to glue clay to sand. The final product is a clay coated and with a "clay color". This product retains none of the clays ion exchange chemistry nor the water holding capacity and thus would be of little benefit to a soil profile via the clay's (or other particles) water holding or catalytic capability, or ion exchange capacity.

The present invention uses clay in conjunction with the previously described hydrophilic SPMS polymer to retain the ion exchange capacity of the clay thus facilitating the retention of fertilization cations. Also, the clay's inherent anion exchange capacity enables the retention of phosphate and silicate. The resulting product reduces leaching of applied fertilizer keeping nutrients in the root zone and thus preventing environmental contamination.

Adhering clay to sand helps to facilitate percolation of water by retaining the porosity of the sand. Simply adding pure clay to a sand soil would clog the pores of the sand and thus impede percolation. The coating of sand via the polymer of the present invention and the hydrophilic clay enhances the waterholding capacity of the sand profile at high water tension. Plants grown in such a profile would experience less stress under drought conditions.

Lastly, the presence of the SPMS polymer of the present invention/clay coating makes the resulting coated sand resistant to the formation of hydrophobic surfaces which can occur spontaneously in uncoated sand. These hydrophobic sands result in irrigation water channeling around affected areas. The turf within these areas can experience severe water stress.

C. Drainage Filtration

Although the preferred embodiment of the present invention is as a supplement to a golf green capable of binding pesticides applied to the green, such a use generally requires implementation during construction or reconstruction of the golf green. Alternative methods of preventing the leaching of pesticides in water supplies are, however, contemplated. Top dressing periodically with the SPMS polymer composition of the present invention as well as backfilling holes which result from routine aeration of turf would eventually result in a retentive surface.

One such embodiment, utilizes an underground pipe system that collects water at a centralized location. This may be one or more sloping trenches lined with soil-filter fabric and filled with gravel (French drains), or a perforated pipe with the perforations facing the bottom of the trench and connected to a solid drain line provides more efficient draining, or other subterranean drainage systems. In one embodiment, the SPMS polymer of the present invention may me added to the soil-filter fabric in another it may be added to the gravel. In yet another embodiment, the SPMS polymer of the present invention may be a component of a filter that the water flows through at a centralized location. This filter may be constructed so that it can easily be replaced periodically. The underground pipe-filter system may be used underground at any section of a golf course, sports fields, lawns, agricultural field, or in any location that pesticides or other organic compounds are applied such as industrial facilities, waste storage and treatment facilities, job sites, construction sites, chemical factories, and weapon facilities.

5.9 Water, Wastewater, and Leachate Remediation

A. Treatment Facilities

The present Invention may be utilized as part of a treatment facility for any aqueous solution suspected to contain organic compounds, e.g., sewage, groundwater, wastewater, leachate, or industrial runoff. Water collected at a common facility may be contacted with the compound of the present invention to reduce the levels of organic compounds or pesticides in the water. Water treatment systems are well known to those of skill in the art and include, but are not limited to, Sequencing Batch Biological Reactor (SBA), continuous activated sludge, trickling filter, aerated lagoon, and anaerobic filter. It is contemplated that these systems, and others, may be adapted to more efficiently treat organic compounds by the processes and compositions of this invention.

The water may be treated by flowing through a column comprising the compound of the present invention or by contacting the water with particles comprising the present invention in a batch method. The batch method comprises adding particles comprising the compound of the present invention to a water sample suspected of containing one or more organic compounds, mixing to allow sufficient contact between the particles and the organic compounds to allow binding, and separating the particles bound to the organic compounds from the newly purified water. Separation may be the product of natural gravity, centrifugation, or filtration through a size selective porous membrane.

U.S. Pat. No. 4,511,657 teaches a method of treating chemical wastes using an SBA system comprising activated sludges. It is contemplated that the compositions of the present invention may be added to the biological organism containing activated sludge or may be utilized in one or more separate tanks comprising activated sludge, or may be used in lieu of the biological material. The latter obviates the need to maintain the viability of living organisms.

B. Filters

The present invention may also be utilized as part of a filter. One such filter system is taught in U.S. Pat. No. 5,685,981. Filters generally have an intake port, a chamber, and an outlet port Commonly, compounds such as activated carbon are part of the chamber and are used in filters to bind compounds in solution. Activated carbons are available in different grades with different binding activities. However, not all grades perform well in all purposes and effective grades tend to be expensive. The present invention may be used In the place of or in addition to activated carbon in the chamber of a filter system. A filter comprising one or more SPMS polymer compounds or compositions would likely increase the range of organic compounds capable of filtration from an aqueous solution.

C. Landfill Leachate Filtration

U.S. Pat. No. 4,995,969 describes a treatment system for landfill leachate. Briefly, the invention is a biological living-filter system for the treatment of sanitary landfill leachate which comprises a treatment basin lined with a water impervious material and filled with an organically enriched treatment medium which is conductive to maintaining a population of micro-organisms. The system also includes leachate tolerant plants growing in the treatment medium. This system, modified to include one or more SPMS polymer of the present invention, provides a greater range of adsorbence when compared to the system minus an SPMS polymer of the present invention. The SPMS polymer may be added to the treatment medium at concentrations disclosed herein, or it may be a component of a filter placed either prior to the application of the leachate to the treatment medium or after the leachate has transgressed the treatment medium. Alternatively, one or more SPMS polymers of the present invention may be used in a landfill leachate treatment system similar to that taught by U.S. Pat. No. 4,995,969 in lieu of the biological material. This obviates the need to establish and maintain a living ecosystem.

6.0 Growth-enhancing and Sorptive Properties of the SPMS

Study 1. Effect of Product Rate on Establishment Rate of Bermuda Grass in a Green-huse Study.

Bermudagrass (Cynodon sp.) commonly is established by planting vegetative sprigs. Stolons and rhizomes spread outward from the planted material, resulting in surface cover of grass vegetation. The rate at which coverage occurs is important, since faster coverage means the turf grass surface can be utilized sooner.

Bermuda grass sprigs were planted in a greenhouse in a quartz sand amended with varying rates of the SPMS polymer composition (0, 12.5, 25, 50, and 100% by volume). Fertilizer and irrigation were applied at conventional rates. On three observation dates, grass coverage was increased by inclusion of the product in the sand (FIG. 11). On the final observation date 27 days after planting, maximum coverage occurred with only approximately 25% inclusion of the product.

Study 2. Effect of Product on Establishment of Bermuda Grass in a Golf Green.

The product was mixed at 25% by volume in a sand/peat (90/10) mix and placed in four plots 0.5×2.0 meters 30 cm deep in a golf green in south Florida. Four equal-sized plots containing only the sand/peat mix also were established at the same time.

The plots were sprigged with Bermuda grass (200 g per plot). Irrigation and fertilizer were equally applied to all plots at conventional rates. Observations of grass coverage were taken periodically. Greater coverage consistently was observed in the plots containing the product (Table 1).

TABLE 1

Effect of the product on Bermuda grass coverage in a golf green

| Treatment | Grass Coverage (%) | | |
|---|---|---|---|
| | 12 Days | 19 Days | 33 Days |
| Sand/peat | 10 | 25 | 60 |
| Sand/peat + Product | 16 | 41 | 76 |

Study 3. Effect of Product on Bermuda Grass Dry-matter Production in a Golff Green.

After the plots in Study 2 were fully covered, the grass was cut periodically with a golf course-type greens mower, and the clippings were collected, dried, and weighed to provide dry-matter production data. Dry-matter production in the plots containing the product was 28 and 21% greater than in the unamended sand on two dates in 2002, respectively (Table 2).

TABLE 2

Effect of product on Bermuda grass dry-matter production in a golf green

| | Dry-Matter Production (g/m2) | |
|---|---|---|
| Treatment | 127 Days | 140 Days |
| Sand/peat | 2.9 | 2.8 |
| Sand/peat + Product | 3.7 | 3.4 |

Study 4. Effect of Product on Laboratory Determinations of Percolation, Soil Moisture and Pore Space.

Samples of the two soil mixes described for Study 2 were analyzed in the laboratory using United States Golf Association (USGA) methods to determine percolation rate (saturated hydraulic conductivity), water holding capacity and pore space (total, large pores, small pores), which are important criteria for root-zone mixes used in golf greens. The samples amended with the product had 31% greater water holding capacity (Table 3). All measures of percolation and pore space for either soil mix were within USGA recommendations. There is no recommendation for water holding capacity.

TABLE 3

Effect of product on laboratory determinations of water holding capacity (WHC), total pore space (TPS), large pores space (LPS), and small pore space (SPS).

| Treatment | Percolation cm/hr | WHC % by weight | TPS | LPS % by volume | SPS |
|---|---|---|---|---|---|
| Sand/peat | 45.4 | 15.9 | 36.0 | 20.2 | 15.9 |
| Sand/peat + Product | 42.3 | 20.9 | 38.4 | 17.5 | 20.9 |
| USGA recommended values | 30–60 | — | 35–55 | 15–30 | 15–25 |

Study 5. Effect of the Product on Soil Moisture Retention in a Golf Green.

Soil moisture was measured in Study 2 at various times following irrigations using an electronic water sensor. The plots containing the product had greater soil moisture (25 to 30% more), results which support the moisture sorptive property of the product (Table 4).

TABLE 4

Effect of the product on soil moisture in a golf green

| | Soil Moisture (% by volume) Days after Planting | | |
|---|---|---|---|
| Treatment: | 5 | 22 | 33 |
| Sand/peat | 10 | 8 | 8 |
| Sand/peat + Product | 13 | 10 | 10 |

Study 6. Laboratory Investigation of the Effect of the Product on Leaching of Pesticides.

The product was mixed at 20% by volume in a quartz sand and placed 100 cm deep over a 40-cm layer of coarse quartz gravel suspended in a glass column 55 cm in diameter over glass wool and a rubber stopper with a single glass tube in the center for drainage. A second column containing unamended sand also was established in the same manner. A solution containing Diazinon® (registered trademark of OMS Investments, Inc.), fensulfothion, and phorate was added in equal amounts to the top of each column. The columns were leached with 1 liter of water. The concentration of pesticide in the leachate water from each column was determined by EPA method #FL01040. All pesticides were lower in the leachate from the column containing the product (Table 5). Diazinon® and phorate in the leachate from the column containing the product were below the detection limit of 1 microgram/L.

TABLE 5

Effect of product on pesticide leaching from columns in the laboratory.

| | Pesticides in leachate (microgram/L) | | |
|---|---|---|---|
| Treatment | Diazino ® | Fensulfothion | Phorate |
| Quartz sand | 17 | 15 | 19 |
| Quartz sand + Product | <1 | 8 | <1 |

Study 7. Effect of Product on Retention of Pesticides in Soil in a Golf Green.

After the plots described in Study 2 were fully covered with grass, the pesticides Orthene®, (registered trademark of OMS Investments, Inc.) Dursbar®, (registeed trademark of Dow Chemical Company) and fenamiphos were sprayed on the plots at labeled rates. Seventeen days after, soil samples (0-10 cm deep) were collected and analyzed for the pesticides retained by the soil mixes. No Orthene® was detected in any of the samples. However, the mix containing the product contained more Dursban®, fenamiphos, and sulfone metabolite of fenamiphos than the unamended soil (Table 6), demonstrating the pesticide retention properties of the product.

TABLE 6

Effect of product on pesticide retention in the soil twenty days after pesticide application.

| | Pesticide in soil (mg/m2) | | | |
|---|---|---|---|---|
| Treatment | Orthene ® | Dursban ® | Fenamiphos | Fenamiphos sulfone |
| Sand/peat | 0 | 5.4 | 23.5 | 22.4 |
| Sand/peat + Product | 0 | 13.4 | 307.4 | 255.9 |

Study 8. Effect of Product on Leaching of Pesticides in a Golf Green.

Devices (lysimeters) for collecting percolate water were installed in the plots described for Study 2 prior to the time the soil mixes were added. After the plots were fully covered with grass, the pesticides Orthene®, Dursban®, and fenamiphos were sprayed on the plots at labeled rates. Percolate water collected in the lysimeters was analyzed for the pesticides. Total pesticide leaching was determined for the 51 day period. Leaching of Orthene®, Dursban®, and the sulfone metabolite of fenamiphos was reduced 65, 100, and 95%, respectively, by the inclusion of the product into the soil mix (Table 7). No leaching of fenamiphos was observed in either treatment. The sulfone metabolite of fenamiphos is known to be quite mobile, and toxic.

TABLE 7

Effect of SPMS polymer on pesticide leaching over a 51 day period (micrograms/m2)

| | Pesticide | | | |
|---|---|---|---|---|
| Treatment | Orthene ® | Dursban ® | Fenamiphos | Fenamiphos sulfone |
| Sand/peat | 2216 | 16 | 0 | 48729 |
| Sand/peat + SPMS polymer | 770 | 0 | 0 | 2680 |

Study 9. Effect of Product on Nutrient Composition of Soil in a Golf Green.

Following full grass coverage of the plots in Study 2, soil samples (0–10 cm deep) were collected from the plots approximately three months after planting and analyzed by standard soil-test methods to determine the retention of plant-essential nutrients following the fertilizations that had been used to grow-in the grass. The soil-test values for two measures of phosphorus availability, and for potassium, calcium, and magnesium were considerably greater in the soils containing the product (Table 8).

TABLE 8

Effect of SPMS polymer composition on soil-test values of important plant nutrients

| | Soil-test values (lbs/acre) | | | | |
|---|---|---|---|---|---|
| Treatment | Phosphorus (water extractible) | Phosphorus (acid extractible) | Potassium | Calcium | Magnesium |
| Sand/peat | 11 | 30 | 12 | 181 | 12 |
| Sand/peat + SPMS polymer composition | 21 | 498 | 112 | 625 | 90 |

5.1 Reaction Components, Result Sequence, Concentrations, Quantities, etc.

The preferred embodiment uses a stoiciometric excess of the dialkyl diphenol (relative to the quantity of PEG reacted) where one or both of the alkyl groups are C8 hydrocarbon chains. The purpose of the excess is to insure only one of the phenol hydroxyl groups is reacted with the MPEG.

Recipe:

| REAGENT | MOLES | GRAMS | RANGE |
|---|---|---|---|
| Dialkyldiphenol | 2 | 656 (R=$CH_3$, R'=C8) | 0.5–10 moles |
| Sodium Hydroxide | 4 | 160 in 400 mls $H_2O$ | 2–5 moles |
| 37% Formaldehyde sol | 6 | 486 mls | 1–10 moles |
| Methanol | 20 | 640 | 10–100 moles |

Allowed to react at 70° C. (30° C. to 110° C.) for 48 hours (10 to 96 hours) with stirring.

This reaction is shown in FIG. 3.

MPEG Br Recipe:

| REAGENT | MOLES | GRAMS | RANGE |
|---|---|---|---|
| MPEG 5000 | 0.5 | 2500 | 0.1–5 moles |
| Phosphorous Tribromide | 0.166 | 45 | 0.05–1 mole |

MPEG 5000 (or any PEG or PEG derivative) is melted at 70° C (about 70°–150° C.) and the phosphorous tribromide is added with stirring. The reaction is allowed to proceed for 1.5 hours (about 0.5–10 hours) while maintaining previous temp. range and is shown in FIG. 4.

REACTION 2: See FIG. 3.

The product of the reaction shown in FIG. 4 is then added slowly with vigorous stirring to the product of the reaction shown in FIG. 3. This reaction is allowed to proceed for one hour (about 0.5–20.0 hours) and is shown in FIG. 5.

The product of reaction shown in FIG. 5 is then added to the phenol-formaldehyde resole preferably procured from BORDEN CHEMICAL COMPANY but all phenol-formaldehyde resoles would be suitable. The use of a phenol-formaldehyde novalac might also be possible in place of the resole.

The approximately seven pounds of product described herein would be mixed until homogeneous with 63 pounds of resole (range 10–200 lbs.) termed herein "resin".

In the preferred embodiment 10% by weight resin (about 1–30%) is pumped into a Simpson continuous muller which is fed silica sand (particle size range passes a 10 mesh and 90% is retained on a 60 mesh screen).

After thorough coating of the sand grains with 10% by weight (ranging from about 2%–about 20% by weight) resin; 10% by weight (ranging from about 2%–about 20% by weight) dried montmorillonite clay is added to the muller.

When the sand is thoroughly coated with clay, the material is fed into an oven. The oven may be a fluidized bed, conveyor, batch, rotary, direct or indirect heating, radio wave, microwave, infrared, etc.

The material is heated to 180° C. (approximate range 100–220° C.) and maintained at that temperature for 20 min (about 10 to 120 min) to effect polymer crosslinking.

Reaction 4: See FIG. 5.

The resulting product is then cooled and the pH adjusted to approx. 6.0 (4.0–8.0) with acetic, sulfuric acid, phosphoric acid, or hydrochloric acid.

6.2 References

The following references, to the extent that they provide exemplary procedural or other state of the art details supplementary to those set forth herein, are specificaly incorporated herein by reference.

Chen and Wang, "Chromatographic methods for the determination of pyrethrin and pyrethroid pesticides residues in crops, foods, and environmental samples." *Journal of Chromatography A*. 754(1–2):367–95, 1996.

Cisar and Snyder, "Mobility and Persistence of Pesticides Applied to a U.S. Gold Association Green, Fate and Management of Turfgrass Chemicals, *American hemial Society Symposium Series*, 743:107–126, 2001.

Cowan et al, "Adsorption by organoclay complexes," *Clay and Clay Minerals*, 9:459–467, 1960.

Gronwald, "Herbicides inhibiting acetyl-CoA carboxylase," *Biochemistry Society Transactions*, 22(3):616–21, 1994.

Hollomon, "Resistance to azole fungicides in the field", "*Biochemistry Society Transactions*, 21(4):1047–51, 1993.

Shishkoff, "A Primer on Fungicide Use," http://222.bonsaiweb.com/forum/articles/arts/fungicide.html Snyder, Elliott and Cisar, "A cross-Linked Phenolic Polyether (CPP) for Reducing Tenamiphos Leaching in Golf Greens", *Int. Turfgrass Soc. Res. J.*, 9:3–7, 2001.

Snyder and Cisar, "Mobility and persistence of pesticides in a USGA-type green. II. Fenamiphos and Fonofos," *Int. Turfgrass Soc. Res. J.*, 7:987–983, 1993.

Snyder and Cisar, "Pesticide mobility and persistence in a high-sand-content green." *USGA Green Section Record*, 33(1):15–18, 1995.

Swancar, "Water quality, pesticide occurrence, and effects of irrigation with reclaimed water at golf courses in Florida. U.S. Geological Survey Water-Resources Investigations Report 954250, " *U.S. Department of the Interior, U.S. Geological Survey*, Tallahassee, Fla., USA., 86, 1996.

Tadeo, Sanchez-Brunete, Valeareel, Martinez, Perez, *J. of Chromatography A.*, 754:347–365, 1966.

Tekel and Kovacicova, *J. Chromatogr.*, 643:291–303, 1993.

Yang et al, "Recent advances in the residue analysis of N-methylearbamate pesticides," *Journal of Chromatography A*, 754:3–16, 1996.

Zaneski, "Wildlife pays the price for green fairways," *The Miami Herald*, Jul. 11, 1A, Miami, Fla., USA, 1994.

http://cypnus.tamu.edu/Texlab/NutstPecan/pecanf.html
http://www.acesag.aubum.edu/department/ipm/Nematode.htm
http://www.gov.sk.ca/agfood/cpg/iccont.htm
http://www.missouri.edu~extbsc/turf/fundesc.htm
http://www.usga.org/green/

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

I claim:

1. A method of making a solids phase mixed solvent polymer for adsorption and retention of solvated compounds, the method comprising;
   (a) reacting a ketone with a phenol to form a dialkyldiphenol;
   (b) methylolating said dialkyldiphenol with an aldehyde;
   (c) reacting a monoalkyl ether of PEG with phosphorous tribromide to form a monoalkyl PEG bromide;
   (d) reacting the products of steps (b) and (c) to form a monoalkyl PEG ether of the methylolated alkyl diphenol;
   (e) combining a phenol-aldehyde resole with said monoalkyl PEG ether of the methylolated alkyl diphenol to effectuate cross-linking.

2. A method according to claim 1 wherein said step of combining said resole includes using a phenol-aldehyde wherein said aldehyde is formaldehyde.

3. A golf course green having the capacity to adsorb and retain solvated compounds and ions, to hold water, to enhance plant growth and having ion-exchange capacity without substantial reduction of percolation rate in said green, wherein said green includes one or more layers of a solid phase mixed solvent polymer composition comprising a polyoxyetheralkyldiphenol formed from the reaction between at least one polyoxyether, at least one alkyl diphenol, and a phenol-aldehyde resole, wherein said resole and said polyoxyetheralkydiphenol, are crosslinked and bound to a matrix.

4. A golf Course green according to claim 3 wherein said composition includes about 1% to about 20% by weight of said polymer and further includes 0.1% percent to about 5% by weight water, about 60% to about 90% by weight sand, and about 3% to about 30% by weight clay.

5. A soil amendment composition resulting from the method of:
   reacting a ketone with a phenol to form a dialkyldiphenol;
   methylolating said dialkyldiphenol with an aldehyde;
   reacting monoalkyl ether of PEG with phosphorous tribromide to form a monoalkyl PEG bromide;
   reacting said monoalkyl PEG bromide with said methylolated alkyldiphenol via the Williamson ether synthesis to form a monoalkyl PEG ether of the methylolated alkyl diphenol;
   combining a phenol-aldehyde resole with the monoalkyl PEG ether of the methylolated alkyl diphenol to form a mixture;
   coating said mixture onto sand particles;
   mixing a quantity of ion exchange material with said coated sand particles; and heating said coated particles to effectuate polymerization; and
   adding sail polymerized ion exchange coated sand particles to the soil to be amended.

6. A composition according to claim 5 wherein said ion exchange material is selected from the group consisting of clay, kaolin, zeolite, metal oxides, manganese dioxide, titanium dioxide, and metal hydroxides.

7. A composition according to claim 6 wherein said ion exchange material is clay.

8. A composition according to claim 6 wherein said ion exchange material is manganese dioxide.

9. A composition according to claim 5 wherein said sand particles are of a size capable of passing through a 10 mesh screen.

10. A composition according to claim 5 wherein about 90% of said sand particles are retained on a 60 mesh screen.

11. A composition according to claim 5 wherein said composition is disbursed substantially throughout a golf course green.

12. A composition according to claim 5 wherein said composition is incorporated into one or more layers within a golf course green.

13. A composition according to claim 5 wherein said ion exchange material comprises between about 2% to about 20% by weight of said composition.

14. A composition according to claim 5 wherein said composition is incorporated within one or more layers of the support structure of a golf green.

15. A method for reducing leaching of organic compounds and ions from a soil, said method comprising:
   combining a phenol-aldehyde resole with a monoalkyl PEG ether of a methylolated alkyl diphenol to form a mixture;
   coating said mixture onto sand particles
   mixing a quantity of ion exchange material with said coated sand particles; and heating said coated particles to effectuate polymerization; and adding said polymerized ion exchange coated sand particles to said soil or turf in an amount effective to prevent leaching of said organic compounds or ions.

16. A method of claim 15, wherein said step of adding an effective quantity of said polymerized ion exchange coated sand particles includes adding said polymerized ion exchange coated sand particles in a concentration of from about 0.1% to about 95% by weight of said soil.

17. A method of claim 15, wherein said step of adding an effective quantity of said polymerized ion exchange coated sand particles includes amending said sand particles to said golf course green in one or more layers.

18. A method of claim 15, wherein said step of adding an effective quantity of said polymerized ion exchange coated sand particles includes adding said polymerized ion exchange coated sand particles in a concentration of from about 15% to about 50% by weight of said soil.

19. A method of claim 15, wherein said step of adding an effective quantity of said polymerized ion exchange coated sand particles includes adding said polymerized ion exchange coated sand particles in a concentration of about 25% by weight of said soil.

20. A method according to claim 15 wherein said step of adding an effective quantity of said polymerized ion exchange coated sand particles includes amending said sand particles as a top dressing on the upper surface of said golf course green.

21. A process for separating solvated organic compounds and ions from an aqueous media that comprises the steps of:
    (a) combining a phenolic prepolymer with a PEG ether of a methylolated phenol to form a mixture;
    (b) coating said mixture onto particles;
    (c) crosslinking said mixture of step (b); and
    (d) contacting said aqueous media containing one or more organic compounds or ions with said particles after step (c) for a time period sufficient to bind said organic compounds or ions onto said particles.

22. A process of claim 21 wherein said methylolated phenol is a diphenol.

23. A process of claim 22 wherein said methylolated diphenol is an alkyl diphenol.

24. A process of claim 22 wherein said methylolated diphenol is a dialkyl diphenol.

25. A process of claim 21 wherein a sufficient quantity of acid is added to said mixture of step (c) to effectuate said crosslinking.

26. A process of claim 21 wherein said mixture of step (c) is heated to effectuate said crosslinking.

27. A method for reducing leaching of organic compounds and ions from a soil, said method comprising:
    (a) combining a phenol-aldehyde resole with a monoalkyl PEG ether of a methylolated alkyl diphenol to form a mixture;
    (b) coating said mixture onto sand particles;
    (c) adding a quantity of ion exchange material to said coated sand particles;
    (d) mixing said ion exchange material and said coated sand particles of step (c);
    (e) polymerizing said mixture on said coated sand particles of step (d) and
    (f) adding said coated sand particles and ion exchange material of step (e) to soil or turf in an amount effective to reduce leaching of said organic compounds or ions.

28. A method of claim 27 wherein heat effectuates the polymerization of said mixture of step (e).

29. A method of claim 25 wherein a sufficient quantity of acid is added to said mixture of step (e) to effectuate polymerization.

30. A method for reducing leaching of organic compounds and ions from a soil, said method comprising:
    (a) combining a phenol-aldehyde resole with a PEG ether of a methylolated phenol to form a mixture;
    (b) coating said mixture onto a matrix;
    (c) polymerizing said mixture on said matrix of step (b); and
    (d) adding said matrix of step (c) to soil or turf in an amount effective to reduce leaching of said organic compounds or ions.

31. A method of claim 30 wherein said matrix is selected from the group consisting of sand, rock, gravel, pebbles, clay, expanded clay, silica gels, zeolites, metal filings, beads, pellets, glass, ceramic, plastics and resins.

32. A method of claim 30 wherein said methylolated phenol is a diphenol.

* * * * *